United States Patent
Penilla et al.

(10) Patent No.: US 10,708,211 B2
(45) Date of Patent: Jul. 7, 2020

(54) MESSAGE COMMUNICATION SYSTEMS AND APPLICATIONS WITH MESSAGE LIFETIME SETTINGS FOR AUTOMATIC MESSAGE DELETION

(71) Applicants: Jason M. Penilla, Los Altos, CA (US); Albert S. Penilla, Los Altos, CA (US); C. Douglass Thomas, Saratoga, CA (US)

(72) Inventors: Jason M. Penilla, Los Altos, CA (US); Albert S. Penilla, Los Altos, CA (US); C. Douglass Thomas, Saratoga, CA (US)

(*) Notice: Subject to any disclaimer, the term of this patent is extended or adjusted under 35 U.S.C. 154(b) by 0 days.

(21) Appl. No.: 16/201,998

(22) Filed: Nov. 27, 2018

(65) Prior Publication Data

US 2019/0097960 A1    Mar. 28, 2019

Related U.S. Application Data

(60) Division of application No. 15/041,089, filed on Feb. 11, 2016, now Pat. No. 10,142,274, which is a
(Continued)

(51) Int. Cl.
*H04L 12/58* (2006.01)
*H04L 29/06* (2006.01)
*H04L 12/26* (2006.01)

(52) U.S. Cl.
CPC .............. *H04L 51/22* (2013.01); *H04L 51/18* (2013.01); *H04L 43/08* (2013.01); *H04L 51/04* (2013.01);
(Continued)

(58) Field of Classification Search
CPC ......... H04L 51/04; H04L 51/18; H04L 51/34; H04L 51/22; H04L 51/16; H04L 63/0227;
(Continued)

(56) References Cited

U.S. PATENT DOCUMENTS 8,296,380 B1    10/2012    Kelly
8,359,289 B1    1/2013    Low
(Continued)

OTHER PUBLICATIONS

Office Action for U.S. Appl. No. 14/985,292, dated Jan. 26, 2018.
(Continued)

*Primary Examiner* — Jungwon Chang

(57) ABSTRACT

Computer implemented methods, systems and computer readable media are provided for processing and managing electronic messaging. In one example, a system includes a client interface for enabling access to users of the electronic messaging system. Each user is provided with an inbox for electronically receiving messages and a sent box for electronically sending messages. The client interface is configured to receive an input for setting a lifetime setting for a message that is composed by a sender to a recipient via the client interface. Further provided is processing logic of the electronic messaging system for tracking messages having a lifetime setting and processing logic for deleting a message having a lifetime setting after expiration of a time period defined by the lifetime setting. The deleting is configured to remove the message from the sent box of the sender and the inbox of the recipient.

20 Claims, 10 Drawing Sheets

Related U.S. Application Data continuation-in-part of application No. 14/985,124, filed on Dec. 30, 2015, which is a continuation-in-part of application No. 14/985,295, filed on Dec. 30, 2015, now abandoned.

(60) Provisional application No. 62/115,309, filed on Feb. 12, 2015, provisional application No. 62/099,105, filed on Dec. 31, 2014.

(52) U.S. Cl.
CPC ............ *H04L 51/16* (2013.01); *H04L 51/34* (2013.01); *H04L 63/0227* (2013.01); *H04L 63/0263* (2013.01)

(58) Field of Classification Search
CPC ...... H04L 63/0263; H04L 43/08; H04W 4/12; G06Q 10/107
See application file for complete search history.

(56) References Cited

U.S. PATENT DOCUMENTS

| | | | |
|---|---|---|---|
| 8,972,495 | B1 | 3/2015 | Borna |
| 9,626,681 | B2 | 4/2017 | Muller |
| 10,142,274 | B2 | 11/2018 | Penilla et al. |
| 10,291,566 | B2* | 5/2019 | Penilla ............... H04W 4/12 |
| 2003/0046421 | A1 | 3/2003 | Horvitz |
| 2004/0030753 | A1 | 2/2004 | Horvitz |
| 2005/0021832 | A1 | 1/2005 | Bennett |
| 2005/0055410 | A1 | 3/2005 | Landsman |
| 2006/0019639 | A1* | 1/2006 | Adams ............... G06Q 10/107 455/412.2 |
| 2006/0112166 | A1 | 5/2006 | Pettigrew |
| 2007/0064899 | A1 | 3/2007 | Boss |
| 2008/0043941 | A1 | 2/2008 | Tang |
| 2009/0037539 | A1 | 2/2009 | Postmus |
| 2009/0105377 | A1 | 4/2009 | McQuillen |
| 2009/0106365 | A1 | 4/2009 | Drory |
| 2010/0185741 | A1 | 7/2010 | Lee |
| 2010/0228830 | A1 | 9/2010 | Uchida |
| 2012/0030293 | A1 | 2/2012 | Bobotek |
| 2012/0117161 | A1 | 5/2012 | Best |
| 2012/0143972 | A1 | 6/2012 | Malik |
| 2012/0159514 | A1 | 6/2012 | Sigalov |
| 2012/0173642 | A1 | 7/2012 | Rosenberger |
| 2013/0173727 | A1 | 7/2013 | Libin |
| 2013/0194301 | A1 | 8/2013 | Robbins |
| 2013/0218986 | A1* | 8/2013 | Sobhani ............... H04L 51/22 709/206 |
| 2014/0032682 | A1* | 1/2014 | Prado ............... H04L 51/34 709/206 |
| 2014/0089416 | A1 | 3/2014 | Wang |
| 2014/0173755 | A1 | 6/2014 | Wahl |
| 2015/0326510 | A1* | 11/2015 | Tomlinson ............... H04L 51/04 709/206 |
| 2016/0164816 | A1* | 6/2016 | Bhagwan ............... H04L 51/18 709/206 |
| 2016/0165040 | A1 | 6/2016 | Queru |
| 2016/0191437 | A1 | 6/2016 | Thomas |
| 2016/0191444 | A1 | 6/2016 | Penilla et al. |
| 2016/0191453 | A1 | 6/2016 | Thomas |
| 2017/0134322 | A1 | 5/2017 | McQuillen |

OTHER PUBLICATIONS

Office Action for U.S. Appl. No. 14/985,295, dated Sep. 19, 2017.
Final Office Action for U.S. Appl. No. 14/985,295, dated Apr. 3, 2018.
Office Action for U.S. Appl. No. 14/985,124, dated Oct. 6, 2017.
Restriction Requirement for U.S. Appl. No. 15/041,089, dated Oct. 23, 2017.
Office Action for U.S. Appl. No. 15/041,089, dated Dec. 5, 2017.
Final Office Action for U.S. Appl. No. 14/985,295, dated Jul. 27, 2018.
Advisory Action for U.S. Appl. No. 14/985,295, dated Aug. 2, 2018.

* cited by examiner

MESSAGE COMMUNICATION SYSTEMS AND APPLICATIONS WITH MESSAGE LIFETIME SETTINGS FOR AUTOMATIC MESSAGE DELETION

CLAIM OF PRIORITY

This application is a divisional of U.S. application Ser. No. 15/041,089, filed on Feb. 11, 2016, entitled "Message Communication Systems and Applications with Message Lifetime Settings for Automatic Message Deletion, which claims priority from U.S. Provisional Patent Application No. 62/115,309, entitled "Message Communication Systems And Applications With Message Lifetime Settings For Automatic Message Deletion," filed on Feb. 12, 2015, and is herein incorporated by reference.

U.S. application Ser. No. 15/041,089 claims priority as a continuation-in-part of U.S. application Ser. No. 14/985,295 entitled "Data Transmission Management For Computer Based Inter-User Communication," and filed on Dec. 30, 2015, which claims priority from (i) U.S. Provisional Patent Application No. 62/099,105, entitled "Computer Based User Communication," filed on Dec. 31, 2014, and is herein incorporated by reference, and (ii) U.S. Provisional Patent Application No. 62/115,309, entitled "Message Communication Systems And Applications With Message Lifetime Settings For Automatic Message Deletion," filed on Feb. 12, 2015, and is herein incorporated by reference.

U.S. application Ser. No. 15/041,089 claims priority as a continuation-in-part of U.S. application Ser. No. 14/985,124 entitled "Network-Based Message System with Database Management for Computer Based Inter-User Communication," and filed on Dec. 30, 2015, which claims priority from (i) U.S. Provisional Patent Application No. 62/099,105, entitled "Computer Based User Communication," filed on Dec. 31, 2014, and is herein incorporated by reference, and (ii) U.S. Provisional Patent Application No. 62/115,309, entitled "Message Communication Systems And Applications With Message Lifetime Settings For Automatic Message Deletion," filed on Feb. 12, 2015, which is herein incorporated by reference.

BACKGROUND

Today, it is popular for people to text message or chat amongst one another. Text messages can be sent by various means, such as Short Message Service (SMS) or dedicated application programs (e.g., instant messaging applications). Examples of dedicated application programs include Whatsapp, Snapchat, Google Talk, ChatOn, and Facebook Messenger. Also, it is popular for people to communicate by electronic mail (e-mail), phone or video calls, using mobile telephones or computers. Mobile telephones enable communication by text messages or voice calls. One example of a VoIP-based phone application is Skype.

As communication options keep expanding, users will necessarily be required to manage multiple accounts for receiving communications. In some cases, users are forced to manage multiple accounts to keep personal and business communications separate. Although expanding the communications options for users is a benefit in terms of expanding the user's communication reach, users are currently challenged to keep up with received messages. This challenge is in part due to an ever increasing volume of communications received by users on a daily basis and in part due to the vast amounts of social and work related demands on a user's time.

Users must also concern themselves with privacy during their communications. For example, user may be concerned that electronic communications are being recorded and may be later resurface in an undesired manner. In some cases, due to the nature of today's messaging formats, later surfacing of statements made in messages may be taken out of context. In other cases, users exchanging messages may simply wish the liberty of exchanging their thoughts openly, but since electronic messages will be saved in some form, open communications between people are hindered.

There remains a need for improved approaches to enable users to more efficiently manage responses to communication requests received from one or more other users.

SUMMARY

Computer implemented methods, systems and computer readable media are provided for processing and managing electronic messaging. The messaging may be in the form of electronic mail, text messaging, chat messaging, video messaging, audio messaging, and combinations thereof.

In one embodiment, a system includes a client interface for enabling access to users of the electronic messaging system. Each user is provided with an inbox for electronically receiving messages and a sent box for electronically sending messages. The client interface is configured to receive an input for setting a lifetime setting for a message that is composed by a sender to a recipient via the client interface. Further provided is processing logic of the electronic messaging system for tracking messages having a lifetime setting and processing logic for deleting a message having a lifetime setting after expiration of a time period defined by the lifetime setting. The deleting is configured to remove the message from the sent box of the sender and the inbox of the recipient.

In another embodiment, a computer implemented method is provided for managing electronic messages. The method includes electronically receiving a message for a recipient. The message is from a sender and associated with a request for assigning a lifetime setting to the message. The method includes determining whether the request for assigning a lifetime to the message has been accepted, then enabling viewing of the message upon determining that the request has been accepted. The method further includes deleting the message automatically when a period of time expires as set by the lifetime setting.

In yet another embodiment, a system for managing assignment of lifetime settings of messages is provided. The system includes a server for managing messages exchanged between individuals. The server is configured to receive a message from a sender to a recipient, and the message includes a lifetime setting. The lifetime setting defines a duration during which the message will remain undeleted. A monitor module is provided for monitoring messages that include the lifetime setting. The monitor module is configured to identify when the lifetime setting for at least one message has been reached. A delete module is provided for deleting the at least one message automatically.

In still another embodiment, a computer implemented method for managing communication of messages between senders and recipients of messages is disclosed. The method includes receiving, at one or more server computers, a request to send a message to a recipient with a lifetime setting. The lifetime setting defines a period of time after which the message will be deleted. Then, requesting, by the one or more server computers, an agreement from the recipient that the message to be sent by the sender to the recipient will have the lifetime setting imposed. The method includes determining whether the recipient has agreed to the lifetime setting and sending, by the one or more server computers, the message to the recipient after confirming that the recipient agreed to the lifetime setting. The method also includes receiving, by the one or more server computers, an indication that the message has been opened by the recipient. Then, starting, by the one or more server computers, a timer to count down the period of time associated with the lifetime setting for the message. In one embodiment, subsequent to deleting, by the one or more server computers, the message after expiration of the timer, the deleting acts to remove the message on the one or more server computers and message interfaces provided by the one or more server computers to enable access to send and receive the message by the sender and the recipient.

These and other advantages will be appreciated by those skilled in the art upon reading the entire specification and the claims.

DETAILED DESCRIPTION

Figure 1:
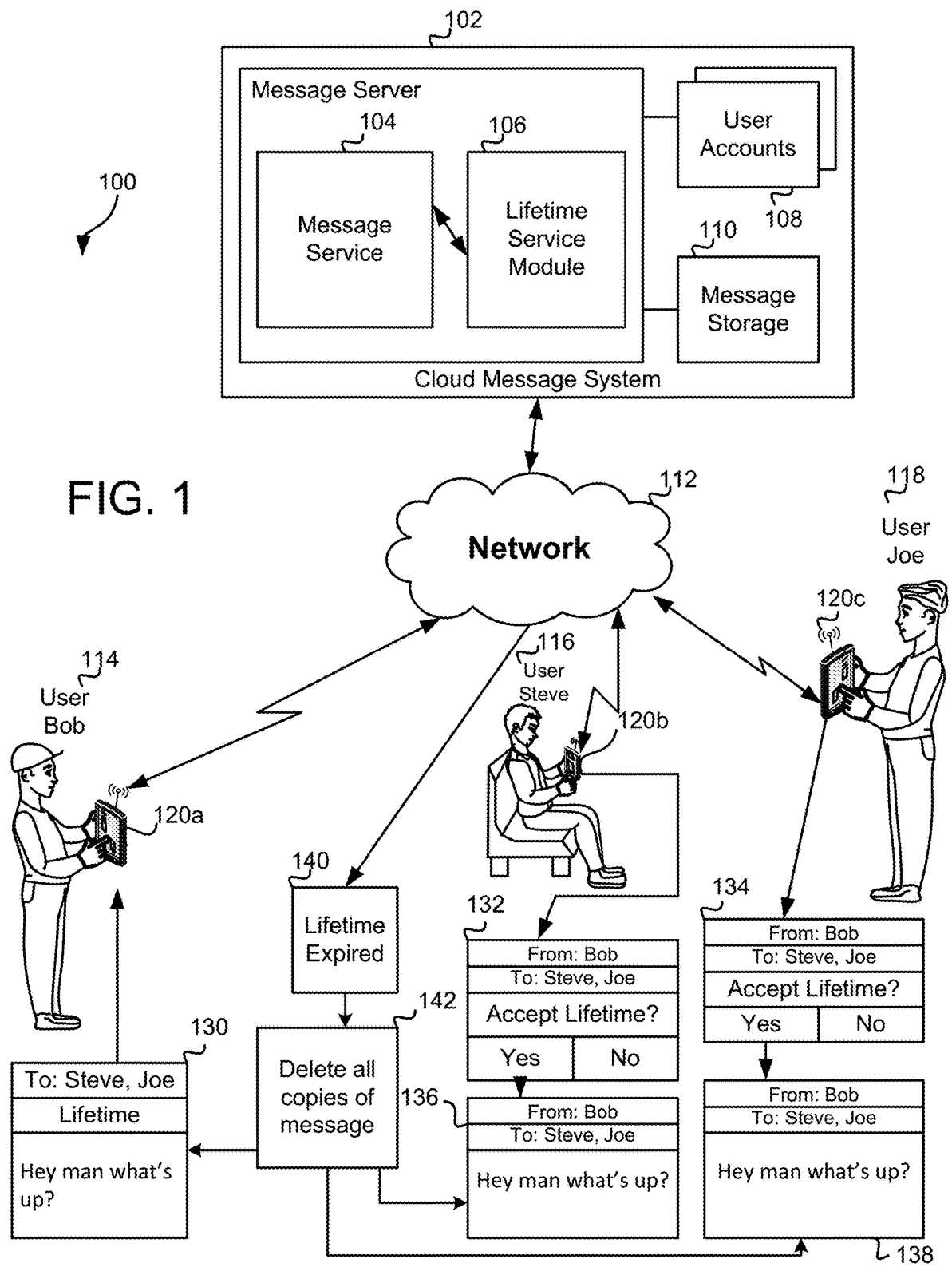
FIG. 1 illustrates an example system for managing lifetime when applied to messages between senders and recipients of the messages, in accordance with one embodiment.

The invention pertains to methods and systems for enhancing electronic communication, such as electronic messaging, amongst users. The methods and systems can allow users to better manage and/or control communications.

One aspect of one or more embodiments of the invention pertains to a controlled electronic communication environment. The controlled electronic communication environment can use a lifetime feature to limit the lifetime of messages being electronically exchanged by users. A lifetime in regard to a message is a setting that allows a sender or recipient of a message to limit the duration of the message before being automatically deleted. In one configuration, a sender of a message may request that the message have a lifetime of some defined period of time. For example, a defined period of time could be 10 minutes after the recipient opens the message. After the determined period of time as elapsed (such as 10 minutes), the message can be automatically deleted. In one embodiment, all instances of a given message can be deleted from wherever stored. The messaging system might provide server storage (e.g., cloud storage) and client applications might provide local storage, but regardless, all stored copies of a message can be deleted based on the lifetime setting. If users are not using the same messaging system, a client application can be directed by a server application to cause the deletion of the messages at the client application. In some embodiments, a plug-in can be installed to provide lifetime management to the client application.

In one embodiment, messages that are sent with a lifetime request are not viewable by a recipient until an agreement with the recipient has been reached. The agreement is an understanding of sender and recipient to treat a conversation under a lifetime condition. In other embodiments, a lifetime request can be sent after the conversation has started. In such a case, older messages in a conversation can be deleted (if the lifetime condition expired) and further messages of the conversation will adhere to the lifetime condition, per agreement of the sender and recipient.

Once a lifetime agreement is established messages between sender and recipient can be exchanged and be viewable until their lifetime expires. In one embodiment, a user (e.g., sender or recipient) can request to modify the lifetime agreement already in place. For example, the user might request extension of the lifetime duration. Such an extension requested might require input from the other user or might be able to be processed automatically. For example, if the user has previously been given extended lifetime for a message or messages, the request might be automatically permitted up to a maximum number of extensions.

Additionally, in one embodiment, while a lifetime agreement is in effect, the client and/or server applications might disable forwarding of received messages, adding of additional recipients, and/or taking of screen shots. The client and/or sever applications might also log a user action, such as forwarding of received messages, adding of additional recipients, and/or taking of screen shots. Another user might also be notified of such user actions.

In still other embodiments, even while a lifetime agreement is in effect, the client and/or server applications permit a user to request archival of messages or a conversation. The requested archival would have to be approved by the other one or more users participating in the messages or conversation. Archival would provide permanent storage of the messages or conversation for possibly later retrieval.

In one embodiment, messages exchanged between users can be encrypted so access to the messages is limited. In one embodiment, an encryption key and a decryption key are symmetric, but in another embodiment, the encryption key and the decryption key are not symmetric. In one implementation, to support lifetime durations, decryption keys can be set to expire. For example, decryption keys can expire (or be expired) at the end of the lifetime durations. As a specific implementation, a server application might provide a one-time use decryption key or a limited time decryption key.

As discussed in U.S. Provisional Patent Application No. 62/099,105, entitled "Computer Based User Communication," filed on Dec. 31, 2014, which is herein incorporated by reference, a throttle can also be imposed. A throttle serves as a way to limit or compact communications with respect to one or more users. The communications can, for example, be text messages, e-mail messages, or telephone calls. The throttle can limit communications in any of a variety of different ways. For example, one type of throttle can impose a limit on the number of chat messages per unit time. Another type of throttle can impose a size limit on messages. Another type of throttle can impose limitations dependent upon the time of day or location of recipient and/or of messages. Another type of throttle can be dependent on status of either sender or recipient. Still another type of throttle can be based on the social connection status of the sender with respect to the recipient (e.g., friends, important friend, less important friend, a friend of a friend, etc.). Further, throttles can be set by a user, e.g., such as by selecting an action to take with respect to a sender of a message, and/or setting rules for actions to take with respect to messages received from a particular sender or senders. In some embodiments, the rules can process one or more conditions that direct when particular actions of a throttle are to be applied. The conditions can be temporal (e.g., different actions for different times of day and/or days of the week), or based on a number of messages received, or based on the context of the message itself (e.g., urgency expressed by the sender in the message data), or based on relationship status of the sender to the receiving user, or combinations thereof. In one embodiment, the throttles that implement the rules and process the conditions can be set by the user via a user interface provided by a communications application. The processing of logic to implement the conditions can be executed by a processor of the device executing the application and rendering the user interface, or can be executed by one or more servers that provide cloud processing for communications applications, or by hybrid processing that includes processing operations on the device of the user and also processing operations on a server, e.g., via a app having access to the Internet. Any of these different types of throttles can be used separately or in any combinations.

The various aspects, features, embodiments or implementations of the invention described above can be used alone or in various combinations.

Embodiments of various aspects of the invention are discussed below with reference to FIGS. 1-9. However, those skilled in the art will readily appreciate that the detailed description given herein with respect to these figures is for explanatory purposes as the invention extends beyond these limited embodiments.

As noted above, messages can be processed in accordance with a lifetime condition. For example, a recipient can define a lifetime that defines how long a message will be retained before being deleted. When a message is deleted, the message will be deleted in a local device as well as a sending device and any intermediate server, to eliminate a record of the message or conversation. In some embodiments, the lifetime can be required by a sender of a message in advance of providing the message to a recipient.

In some embodiments, a recipient can tag certain senders as senders for which communications should be governed by a lifetime condition and thus should not be saved long term and should be deleted from the sender's records and storage, from the communicating network entity (i.e., phone company, communication provider, Internet service provider, online mail providing entity, etc.) and from the recipient's devices and records. In other examples, a user can select an option to lifetime a communication when a message is sent. In this case, a message is first sent to a recipient asking if the recipient will accept the message with a lifetime setting. If the recipient accepts, the message is made viewable to the recipient. If the recipient declines, the message is not made viewable to the recipient.

Once the lifetime condition expires for a message, the message will be deleted from storage (e.g., storage of the recipient's device and the sender's device, as well as any copies if present). In one embodiment, the communicating entity can still record a usage record (e.g., a log). The usage record may, in one configuration, store the data without a date and time, but still allow for billing and/or record keeping. Some data that may be stored may include, for example, metadata regarding calls or messages made, time of calls or messages, dates of calls or messages.

As a further example, a lifetime requirement for a conversation or message can be requested by a recipient to secure agreement between the sender and the recipient that a lifetime will apply to one or more messages between sender and recipient. The sender's and recipient's devices and communication services adhere to the lifetime settings. Once this agreement is set between the communicating parties, the parties can communicate messages that will be expunged from all records after the lifetime expires. The lifetime can be based on when the message is opened by or for a recipient. For example, a message can be considered "opened" if at least a part of the content of the message displayed on a display device available to the recipient. The lifetime can be, for instance, within a predetermined time of being received, whether read or not. Alternatively, the lifetime can be, for instance, within a predetermined period of time after being read by the recipient. One embodiment can include a read detection process, such as detecting scrolling of a viewing pane, moving controls of the user interface presenting the message, having the message client open on the display with the message in view, biometric detection to see if the user is reading the email, or combinations thereof.

In one embodiment, a lifetime requirement can be pre-assigned to particular recipients. For example, some users can assign certain of their contacts to automatically have lifetime settings (and can set different lifetime durations therefore). Thus, when a conversation is started by either party (i.e., sender or receiver) and agreement is secured, then message exchange can begin in accordance with a lifetime condition. In yet another embodiment, if recipients have previously agreed to a lifetime restriction with the sender, subsequent communications between the users can also adhere to the lifetime restriction. In such an example, the parties may be reminded that the messages exchanged will have a lifetime. It should be understood that the lifetime condition can apply to voicemail messages, video chats, voice chats, text chats and email communications, generally referred to as electronic communications.

In one embodiment, email communications that adhere to a lifetime condition can be implemented an intermediary server that processes email messages between a sender's device of a sender and a recipient's device of a recipient. For example, if a lifetime condition has been assigned for email communications, when an email communication arrives in an inbox, selection of the email communication will launch a window or iframe that allows reading of the email communication and/or composing of a responsive email communication. The email communication, in this example, is not actually delivered to the recipient's inbox, but is actually just a link to an online email client that can manage communications between the parties, which can include imposition of the lifetime condition. In this example, the remotely hosted email client can hold the email, email string, email conversation, etc., for a limited period of time as set by the lifetime condition.

In another embodiment, messages exchanged by the parties will be via a common online message system, e.g., online mail service. If both parties have accounts with the same online mail service, each party may communicate with the online mail service via a respective client. When a user accesses the services of the online mail service, the user may see their account, including an in-box, sent-box, draft-box, history-box, etc. If a message is sent via the online mail service, the message is actually managed by one or more central servers which provide services of the online mail service, and not actually delivered. As such, upon assigning a message a lifetime condition, securing agreement, and expiration of the lifetime condition, the message is then deleted from storage of the online mail service. Once deleted, the message will disappear (e.g., deleted) from the sent-boxes and in-boxes, including any instances where the message might be cached in server cache locations.

In one embodiment, the limited period of time for a lifetime condition/restriction can be, for example, 10 minutes, 30 minutes, 1 hour, 2 hours, 1 day, 2 days, one week, one month, etc. In some implementations, before agreement is reached to lifetime a message or conversation, the parties might exchange alternate proposals for the limited period of time. For instance, if one user wishes the limited period to be 3 minutes, and the other wishes 30 minutes, an exchange can be facilitated to allow the parties to mutually agree on an alternate limited period of, for example, 15 minutes.

In some examples, either user can decide at any time to impose a lifetime condition/restriction an earlier sent or received message or conversation of messages. In this manner, the messages can be dynamically found, collected and deleted if the lifetime has expired, which provides for a comprehensive search and destroy process, based on an agreement, typically a joint agreement, of the parties to lifetime a message or messages. Further, in one embodiment, the lifetime condition/restriction can be dynamically set based on identity of the sender of a message or on identity of the recipient of a message.

In further embodiments, depending on sensitivity of content being exchanged, a lifetime condition/restriction can be automatically applied. For example, if the content of a message appears to use sensitive wording or language, a lifetime condition/restriction can be suggested to both the sender and the recipient. In some embodiments, a business can set rules for applying lifetime conditions/restrictions, which could vary or depend on the sensitivity of the communications or the persons involved in the communications.

In some embodiments, a lifetime setting can be used for enterprise social collaborative apps. In such cases, communications between one or more persons can be assigned a lifetime settings. In some embodiments, certain people in an enterprise can be pre-defined (e.g., by an admin) to have a lifetime settings for all or certain communications. Say for Bob, his messages get a two month lifetime, and for Jan, her messages get a two day lifetime. A company can set a lifetime for each employee, and/or each employee can set different lifetimes for different messages. In one embodiment, an enterprise solution used for collaboration can enable usage of lifetime setting for data and/or communications. As noted, a company itself can have an admin control and/or pre-set lifetimes to messages with or without agreement of the parties/users. For example, in the UI of the message, the lifetime can be shown, so all parties know that the messages will be associated with a lifetime setting. If the message is more confidential, then the lifetime can be made shorter.

In addition to messages, lifetime settings can be assigned to files and data of an organization or individual. The lifetime settings to files can act to auto delete the files after the lifetime expires. Applying lifetime settings to files can act to reduce the usage of storage space by organizations or individuals. Still further, a database can include indicators or identifiers that mark certain files, data and/or communications as having a lifetime setting. The database can also be interfaced with a program and/or logic that manages the lifetime settings. Managing the lifetime setting can include scanning files or messages for lifetime expiration and causing the deletion of the files and/or messages.

FIG. 1 illustrates an example system 100 for managing lifetime when applied to messages between senders and recipients of the messages. The system 100 includes a cloud message system 102 that would enable message handling for one or more users, e.g., by processing provided by a message server or servers. The example system 100 may include a hosted email system, a chat application, a corporate mail service, a cloud hosted mail service, an online mail service, and the like. In one embodiment, a message service 104 can be one of many services offered by an internet media entity. Other services may include video chat, text chat, picture exchange, picture/image-based chat, search, picture storage, online word processors, online spreadsheets, etc.

The message service 104 is shown in communication with a lifetime service module 106. The lifetime service module 106 may include logic for processing messages in accordance with a lifetime agreement (e.g., timer function and deleting function). In one configuration, the lifetime service module 106 may be a separate module from the message service 104. In another configuration, the lifetime service module 106 can be integrated with the message service 104. The lifetime service module 106 can provide the functionality for providing the ability to impose a lifetime to certain messages, provide dialogs for securing agreement between parties, provide notifications of lifetime enforcement, provide for permanent deletion of messages from online storage or storage of remote clients, and the like.

In some embodiments, the lifetime service module 106 can process all operations for enabling the lifetime of messages. In other embodiments, the lifetime service module 106 may process server-side operations and will also communicate with client-side applications. In one embodiment, the client-side applications may be applications downloaded from an application store online. The applications can include the graphical user interfaces for accessing messages, viewing messages, sending messages, replying to messages, requesting lifetime of messages, agreeing to lifetime of messages, and showing notifications regarding lifetime, etc.

The message server is, in one embodiment, configured to manage user accounts 108. The user accounts 108 are those associated with users that have signed up for the message service 104 or other services of the entity. In another embodiment, the user accounts may be those assigned to users by a corporate entity, e.g., such as corporate email or messaging services. The message server is also configured to interface with message storage 110. Message storage 110 can be local to a server or can be distributed in a data center or many data centers. The message storage 110 is configured to store messages, e.g., either until deleted by the user or deleted by the lifetime service module 106.

Continuing with FIG. 1, it is also shown that the cloud message system 102 is in communication with a network 112. The network 112 may be a local network or a distributed network like the Internet. This example also shows user Bob 114, user Steve 116, and user Joe 118. Each user has a device (120a, 120b, and 120c), e.g., a smartphone for communicating messages. Other devices are also possible, such as desktop computers, tablet computers, laptops, connected watches, and other wearable devices. In general, any device having computing and communication capabilities for accessing a web browser or custom application that can access the services of the cloud message system 102, to make use of lifetime functionality.

In this example, user Bob 114 composes a message (msg) 130 to Steve and Joe and also includes a selection to "lifetime" the msg. At this point, the message is not sent to Steve and Joe, but instead a notification is sent to Steve and Joe asking if they will approve a lifetime for the message. For example, user Steve 116 receives notification 132 asking if he would approve to lifetime the message, which user Bob 114 wishes to send. If the recipient of this notification is unaware of what it means to lifetime a message, the recipient can be provided with more information to read in (or accessible to) the notification. The information can explain that messages can be viewable for a limited period of time, and that the messages will automatically be deleted after the limited period of time. In this example, user Joe 118 is also provided with the notification 134 asking for approval of a lifetime for the message and conversation (if messages are exchanged for the initiated message). For illustration, both user Steve 116 and user Joe 118 have agreed by selecting a "yes" button, icon, text or input.

Once each user agrees, the message 136 is made readable or accessible to user Steve 116 and message 138 is made readable or accessible to user Joe 118. However, the limited period of time for each user may expire at different times, and which can depend on when Steve or Joe opens the message.

Further, in the case of multiple recipients to emails or messages, as shown, it is possible for one recipient (e.g., user Joe 118) to not open a message or message client and know that a message came in for some time. If the conversation between user Bob 114 and user Steve 116 occur by the exchange of one or more messages, the messages not yet viewed by user Joe 118 may be queued up. In one embodiment, the one or more messages may be shown to user Joe 118 as an email thread of the conversation exchange between user Bob 114 and user Steve 116. In one configuration, provided that user Joe 118 agrees to the lifetime of the messages, the amount of time provided for Joe 118 to view the message string can be extended. For instance, if three messages were queued for user Joe 118, then 3× the timer lifetime agreed can be provided, as the messages are 3× as long to read, e.g., to catch up. Once the lifetime expires, these messages for Joe 118 will be expired.

For the sender, in one embodiment, an indicator may be provided to inform the sender who has viewed the messages and who has not. If some person does not view the messages for a set period of time, e.g., 1 day, 2 days, 1 week, 1 month, etc., the system may automatically delete the messages that were queued. In another embodiment, the sender or a party to the conversation may choose to delete a user (e.g., Joe 118) from the conversation, which deletes reminders to the user to read messages.

Additionally, the cloud message system 102 can include a database. The database can store tables or structures of data that denote which senders and receivers have established lifetime agreements. For example, in one embodiment, a sender and receiver can agree by exchanging coded communications that all further conversations will be governed by an existing lifetime agreement. Additionally or alternatively, the database can include a user's default setting for desired lifetime duration and/or whether user requires lifetime for messages with all or some recipients.

The cloud message system 102 can also operate to automatically request lifetime from a recipient, if the recipient has not already agreed to the lifetime condition requested. The database can be accessed to determine whether the recipient has already agreed to the lifetime condition.

Figure 2A:
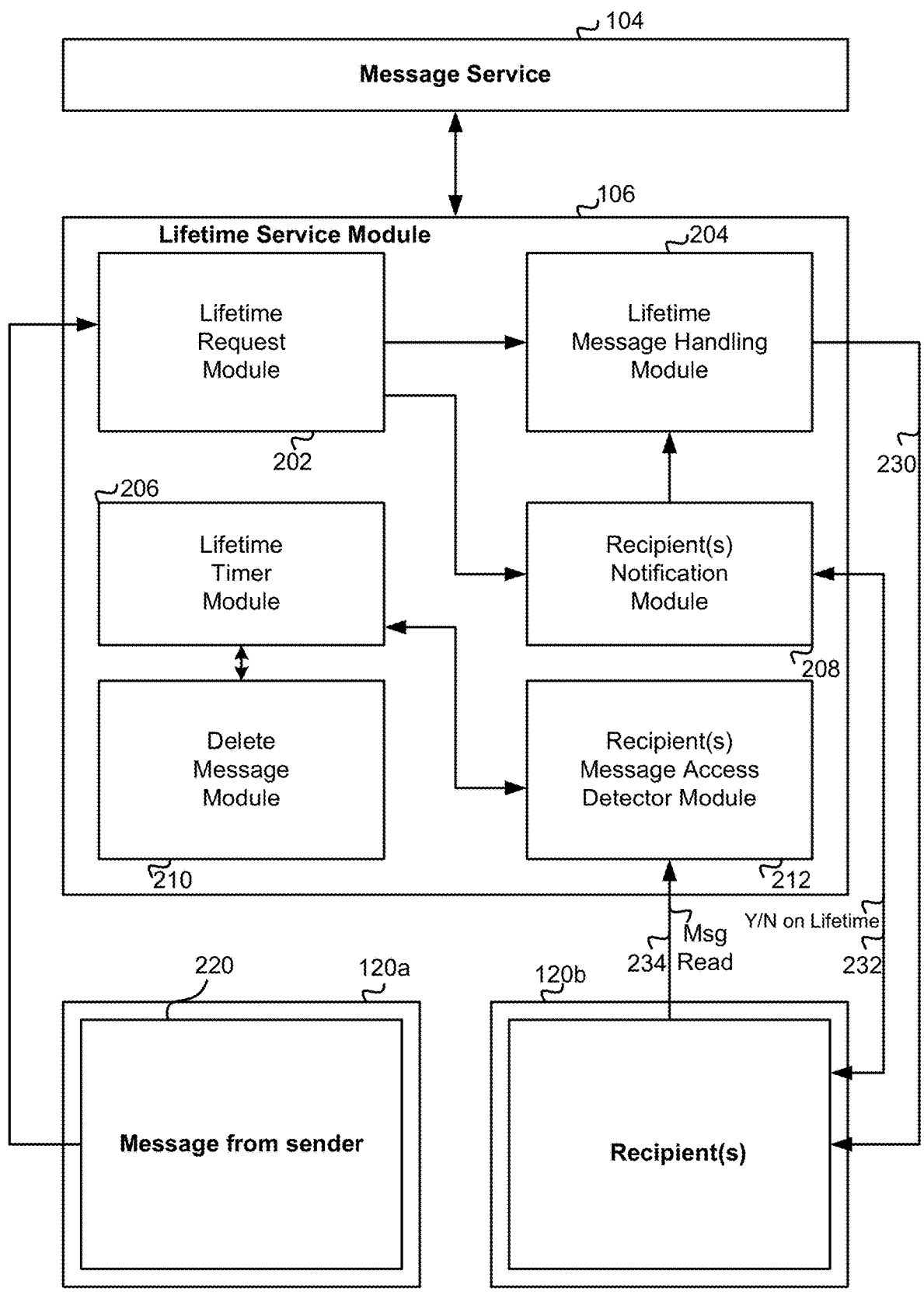
FIG. 2A illustrates one example of processing modules that may be implemented by the lifetime service module, in accordance with one embodiment.

FIG. 2A illustrates one example of processing modules that may be implemented by the lifetime service module 106. It should be understood that depending on the implementation, more modules, fewer modules or different modules may be used to complete the lifetime processing. In this example, the message service 104 is in communication with the lifetime service module 106, as discussed in FIG. 1. In one embodiment, the lifetime service module 106 can include a lifetime request module 202, a lifetime message handing module 204, a lifetime timer module 206, a recipient notification module 208, a message delete module 210, and a recipient(s) message access detection module 212. In one example, a sender generates a message 220 (msg) to be sent by a sender device 120a to a recipient or recipients, which may be receive messages via a device 120b that provides access.

In this illustration, the message service 104 will detect that the user, e.g., Bob, has sent a message to a recipient, e.g., Steve, and the message needs processing for lifetime control. In this case, the message is processed by lifetime request module 202. Lifetime request module 202 will determine that the sender wishes the message(s) to have a lifetime imposed, e.g., with a timer of 10 minutes. The lifetime request module 202 will communicate with recipient notification module 208, which is configured to send a message or notification to the recipient user. This notification will alert the recipient that a message from a particular sender has been received and the sender wishes to impose a lifetime condition on the message and/or conversation.

The notification may be, for example, "You have received a message from Bob, and Bob would like to "lifetime" this message and subsequent messages in this conversation. The lifetime requested is 10 minutes. Do agree?" If Steve does not understand what it means to "lifetime" the message, an option may be provided to explain that a lifetime message will have a duration of life, and after that life expires (e.g., a timer has expired), the message will be deleted without further action by the sender or receiver. In one embodiment, the sender's copy of the message may also automatically lifetime. The sender's copy of the message may lifetime immediately after sending or can expire after the last recipient has viewed the message and the duration of life (e.g., timer has expired) for the recipient. If the sender's copy requests lifetime immediately after sending, the sender will know what the message was sent with a lifetime setting. If the recipient chooses to reply, that message may contain the string of earlier messages, which themselves may have sub-lifetime settings or timers. In one example, when the last communication expires in a thread, the timer will expire for all parties in accordance with the lifetime setting and all copies and instances will be deleted.

If the recipient notification module 208 determines that the recipient has accepted or agreed to the lifetime, it will notify the lifetime message handling module 204. The lifetime message handling module 204 may operate in various modes. One mode may include encryption of the message, so that the encrypted message can be sent to the recipient along with the notification. If the recipient agrees to the lifetime (e.g., communication 232), an encryption key can be sent to the recipient by the lifetime message handling module 204 (e.g., communication 230) so that the encrypted message can be opened by the recipient. Another mode may not include encryption, so the message may not be sent to the recipient's inbox until the recipient agrees to the lifetime setting.

FIG. 2A also shows interaction between the recipient message access detection module 212 and the recipients. If a message is determined to have been read (e.g., communication 234), then the recipient message access detection module 212 may notify the lifetime timer module 206 so that a timer can be started. As discussed above, the timer may be for a period of time, e.g., 30 seconds, 1 minute, 5 minutes, 10 minutes, 30 minutes, 1 hour, 2 hours, 3 hours, 1 day, 2 days, 1 month, or some user configured setting or user negotiated setting between the parties.

Once the timer is determined to have expired, the message or messages will be deleted by the message delete module 210. As noted above, if the users are utilizing an online or cloud message service, or hosted message service, the message may be deleted by the server from all instances. If the service is managed by a server and interfaced with clients, wherein clients can also store messages, the server and/or the clients can be instructed to or coordinated for deletion of the messages by the message delete module 210.

The message delete module 210 can be configured to find, search, and delete all copies or instances, whether they be in volatile or non-volatile storage, back-up, archived, remote stored, or the like. An algorithm of the message delete module can be configured to trace the message in any storage so that the message can be deleted. In other embodiments, if a message has been tagged to be handled for lifetime (e.g., with a flag, marker, table setting, or metadata), that message or messages are not allowed to be backed-up or re-copied to remote storage and the like (e.g., to avoid making copies that need to be traced and deleted). These messages are stored or are considered stored, for example, in temporary storage. Temporary storage is not backed-up, or if it is backed-up, it is only backed-up locally in temporary storage for the period of time consistent with the timer of the lifetime.

In one embodiment, the messages may be stored encrypted, and once the message is deleted or identified as deleted, the decryption key is also deleted or expired. The decryption key can be, for example, generated for the unique session of the message exchange and can include random number generators or salt inputs, which makes recovery of the messages secure, in case any message is not fully deleted at either the server, server storage, backup or a client. In general, however, since the senders and the recipients are agreeing to lifetime the messages, it is believed that the users presumably have no interest in keeping the messages after the lifetime expires.

Figure 2B:
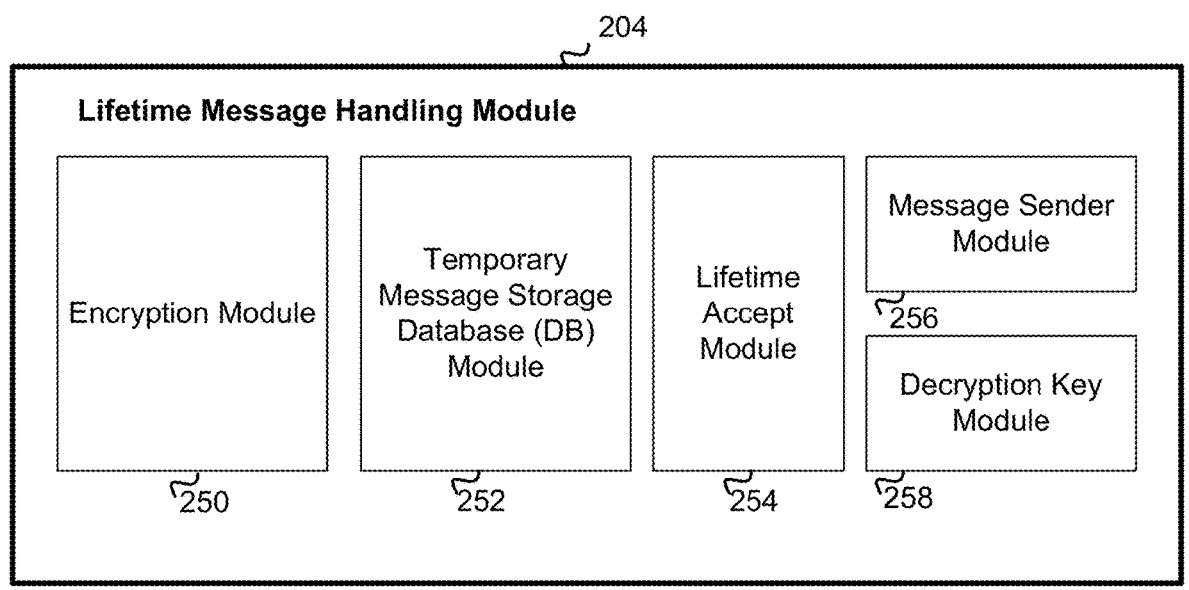
FIG. 2B illustrates an example of various modules and/or logic that may be included in the lifetime message handling module, in accordance with one embodiment.

FIG. 2B illustrates an example of various modules and/or logic that may be included in the lifetime message handling module 204 accordingly to one embodiment. These modules may include an encryption module 250, a temporary message storage database (DB) module 252, a lifetime accept module 254, a message sender module 256, and a decryption key module 258.

As noted above, the messages can be encrypted when sent to the user, e.g., when the notification is sent to the recipient asking if the recipient will agree to a lifetime for the message and/or conversation. If the recipient agrees, a decryption key is sent to the recipient to allow the recipient to open the message. In one example, the recipient may see a message in his inbox, but it will be shown with a lock or visual indicator and if the user tries to open, the message will not be seen. Instead, a notification asking for the user's agreement to lifetime the message is shown. If agreed, the decryption key is sent to the recipient to allow opening of the message. As viewed from the recipient, the acceptance to lifetime appears to allow access to the message, and the fact that a decryption key was sent in the background to the client of the recipient can be transparent. In one embodiment, the encryption may use metadata regarding the messaging session, e.g., the user's login data to the email client or application, the user's name, or other salted data. In one embodiment, to release the decryption key, the user may need to provide other login data that may include the user's name, password, credentials, keywords, numeric input, voice input, or biometric input, or combinations thereof. In another embodiment, the messages can be encrypted using a general encryption process.

The temporary message storage database (DB) module 252 is configured to manage the messages and denote those messages that are associated with a lifetime setting. The temporary message storage database (DB) module 252 may be configured to store messages associated with a lifetime in separate storage area or logically separate storage area. In one embodiment, the separate storage area (physical or logical) will enable more efficient deletion of messages after the lifetime timer has expired. As noted above, it is also possible to treat such messages differently, such as to avoid certain types of backups, or disallow transfers to different storage while the messages are held. In some embodiments, the messages are stored in a circular buffer, such that the same circular buffer (or memory space) is rewritten with other messages. Rewriting the same storage will also avoid possibilities to reconstruct data from, for example, hard drives. In other embodiments, the storage used for messages associated with a lifetime setting may only be stored in volatile memory or only in solid state drives (SSDs), or other storage that makes it fast to find, index and erase all instances or copies of the lifetime messages, after the time has expired.

Lifetime accept module 254 is configured to process the acceptance from the recipient notification module 208. For example, the lifetime accept module 254 can indicate to the lifetime message handling module 204 that the message should be sent to the recipient in a fully accessible mode or the decryption key should be sent to enable opening of the message, provided that the recipient has accepted the lifetime request.

Message sender module 256 is configured to forward the message to the recipients into their inboxes, receiving modules, applications that receive messages, interfaces the receive messages, or transmitted to a remote client through which the recipient receives messages. If the message service 104 is an online message service, then the sender module 256 simply places the message into the inbox of the recipient. If the message service 104 is one that uses a server and separate clients receive messages from the server, the server will send the messages to the recipients using the sender module 256. In one implementation, the sender module 256 may also send the encryption key for decrypting the messages by the recipients once the recipient or recipients have indicated their acceptance of the lifetime for the message or conversation of messages. In one configuration, the lifetime message handling module 204 may also include a decryption key module 258. The decryption key module 258 may be configured to store keys generated by the encryption module 250 and also be configured for communicating with the message sender module 256 for sending the keys for decrypting the messages by the recipients, once it has been determined that the recipient has agreed to the lifetime for the message or messages.

Figure 3:
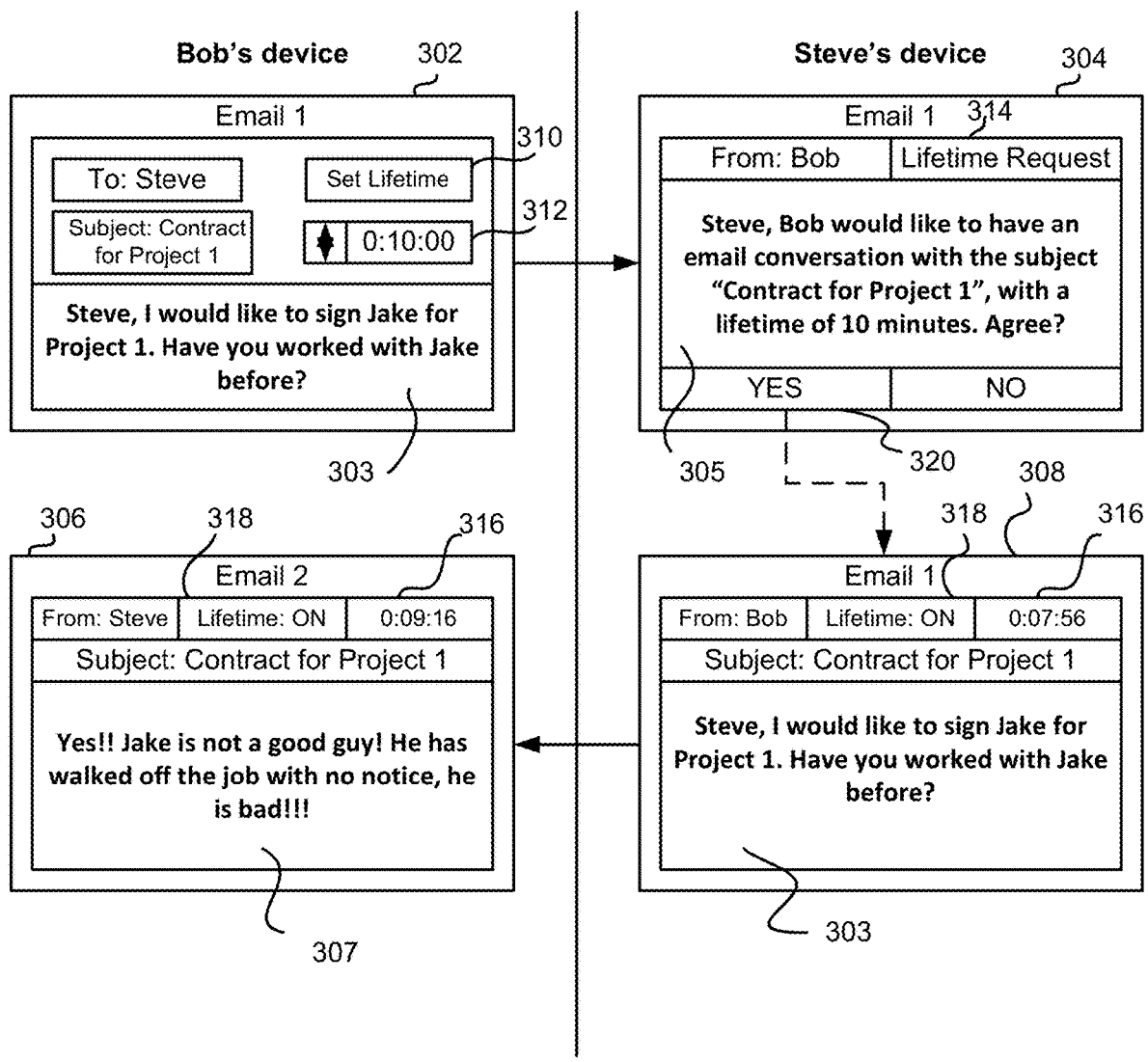
FIG. 3 illustrates one simplified example of e-mail messages being sent between users, in accordance with one embodiment.

FIG. 3 illustrates one simplified example of e-mail messages being sent between users. In this example, the users are users Bob and Steve. As discussed above, the messages are not restricted to e-mail messages, and are equally applicable and useful for transmission and communication of messages such as text messages, chat messages, video chat messages, picture chat messages, SMS communications, and other types of electronic communication between users that are implemented using computing devices. Examples of computing devices include desktop computers, tablet computers, laptop computers, smart watches, wireless communication devices, such as mobile phones, and other wearable devices.

For purposes of example, a first e-mail message 302 is composed by Bob and is directed to the attention of Steve. The e-mail concerns the subject "Contract for Project 1," which may be considered the topic of a conversation. For purposes of clarity, a conversation can include one or more messages between at least two users. A conversion can also be referred to as a session. In this example, the message body, i.e., content 303 of the message 302, includes the text "Steve, I would like to sign Jake for Project 1. Have you worked with Jake before?" Additionally, the user interface provides the ability for user to select or set a lifetime 310 and also assign a duration 312 for the lifetime of the message. The duration 312 can be set by the sender, which in this case is Bob. The duration 312 can be configured to be more or less depending on the user's choice. As described above, the setting of 10 min. as set for the message 302 is only one example.

At this point, the message 302 is not presented to Steve with the content 303 of the message. Instead, a notification message 305 is delivered to Steve. The notification message 305 requests permission or agreement from Steve (the recipient), as to whether agreement can be made regarding the lifetime of the message 302 to be sent. In one embodiment, the message 302 may or may not already have been delivered to Steve's device or inbox, but would not yet be visible to Steve. If Steve selects to agree 322 to the lifetime request 314, the content 303 of the message 302 sent by Bob can be disclosed or shown or made accessible to Steve such as displayed on Steve's device, or placed within Steve's inbox. In one embodiment, a timer 316 is also shown illustrating the amount of time left for the message (e.g., once the message has been opened). A lifetime indicator 318 can also be shown in one embodiment as an indication that the lifetime for the message is active.

Now, the parties have agreed (i.e., two-way agreement) that the conversation will be subject to lifetime processing, and Steve's reply will be sent in accordance with its own lifetime timer 316 which will run when Bob opens his message 306 from Steve. The content 307 of the message 306 from Steve is shown to Bob, because Bob has already agreed to lifetime the conversation. In one embodiment, the content 307 of the message 306 can also include the string of messages for the conversation. For example, the content of the message 306 can also include the content 303 of Bob's initial message 302 if Bob decides the scroll up or down to view that additional data. However, once the timer 316 has expired, the message 307 and any appended data would also be deleted.

As mentioned above, the deleting of messages may include deleting messages on a server for an online service, which would delete the message from both the sender and the recipient (such as their inboxes and sent boxes). If the server is operating with remote clients, the server may send instructions to the remote clients to cause the deletion of the messages. In one embodiment, messages that have lifetime enabled are sent with metadata to the remote clients such that the remote client can note that those messages are associated with a lifetime. The remote clients can then operate to delete messages, as per lifetime, at the remote clients automatically (i.e., programmatically without user action) without the need for the server to communicate the instruction to delete.

In the above example, the message 302 is an e-mail message. In another embodiment, messages being communicated can be text messages, such as those utilized in a chat application. A timer, if depicted, can be displayed in a window or user interface of the chat application. The timer can provide heads-up information to users that a message will expire within a set period time, as dictated by the lifetime associated with the message. Providing this remaining lifetime information allows users to quickly review the message before the message is deleted automatically.

Figure 4:
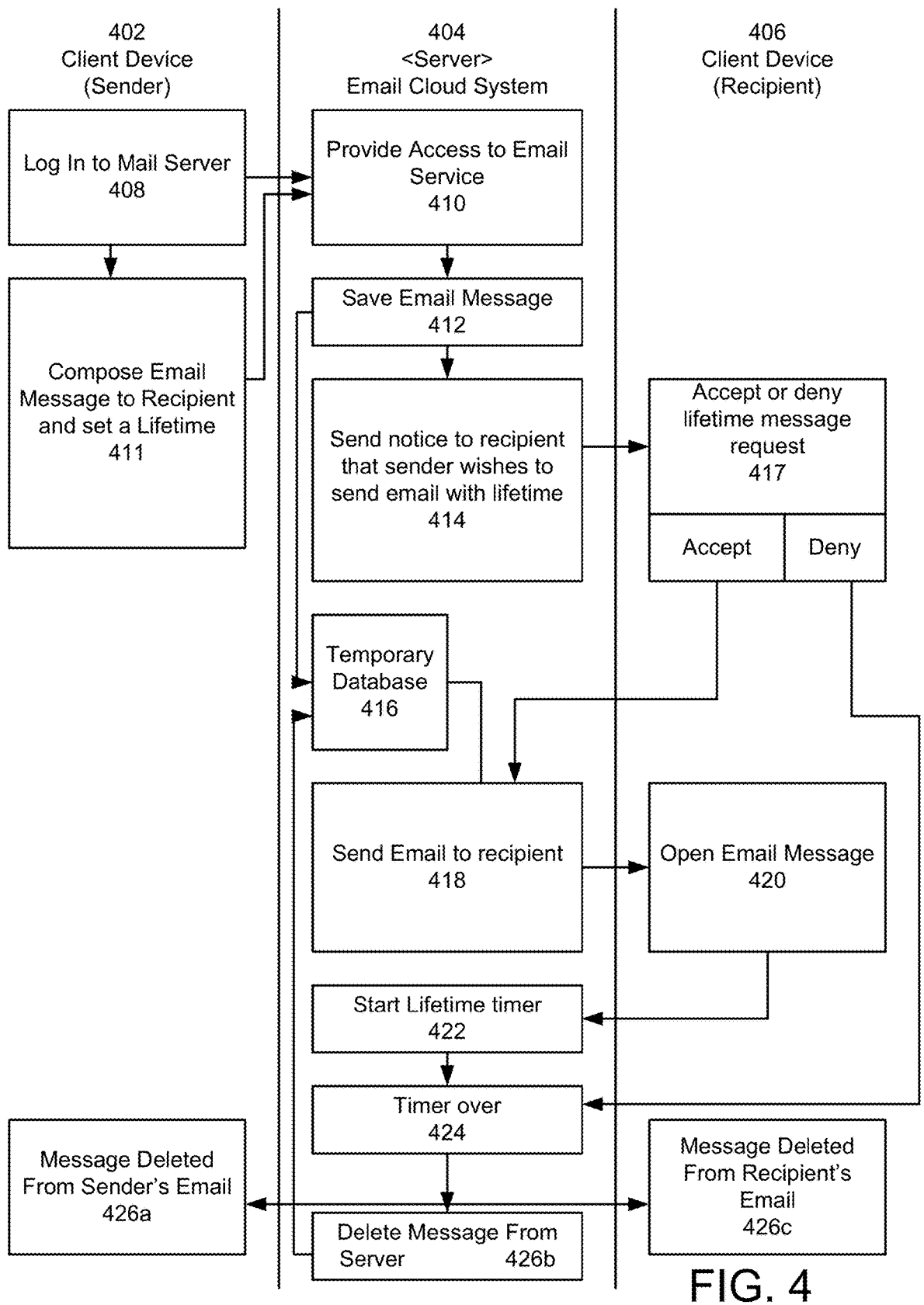
FIG. 4 illustrates another example of communication between a client device, a server, and another client device, in accordance with one embodiment.

FIG. 4 illustrates another example of communication between a client device 402, a server 404, and another client device 406. In one embodiment, the client device 402 is the sender who may be using an application client. The client device 406 may be for the recipient which may also be using an application client. As noted above, some embodiments will allow for both sender and recipient to be using the same messaging system, wherein both clients can be controlled by the server 404. In other embodiments, the server and the applications may be operated by different entities, but the clients can implement code to allow for processing of lifetime and coordinate with a server for implementing a lifetime agreement between the parties.

In one embodiment, the client device 402 can login 408 to the server 404, which may be an e-mail cloud system. The e-mail cloud system can provide access 410 to the mail service, if the sender has provided the appropriate login information, such as user name and password or some other credentials. The sender, using the client application 402 can then compose an e-mail message to the recipient and assign a lifetime, which is a time duration for the e-mail message to be sent to a recipient at operation 411. In operation 412, the server 404 will save the e-mail message to a temporary database 416, because the e-mail message has been tagged to be lifetime processing dependent. In one embodiment, the server 404 will then send a notice 414 to the recipient that the server wishes to send an e-mail message with a lifetime restriction to the sender. This message is sent to the client device 406 or to the inbox of the recipient which may be utilized by the client device 406.

In operation 417, the recipient may accept a lifetime request, or suggest a different duration for the lifetime request or simply deny the message. This information is communicated to the server 404 and processed by the server 404. If the user has accepted the lifetime request, operation 418 is processed by the server 404 which would send (or display) the e-mail message to the recipient with accepted lifetime duration imposed. In one embodiment, the e-mail message may already be present in the inbox of the recipient when the lifetime request is sent by notification 414, and thus the sending of the e-mail 418 may simply surface or show the e-mail in the inbox without restriction.

In operation 420, the recipient can then open the e-mail message and read its content. Upon opening the e-mail message 420, a timer is started in operation 422 by the server 404. The timer can monitor when the time the e-mail message was opened in operation 420 to the time of its expiration. When the timer expires in operation 424, the server 404 will send an instruction or process instructions 426a, 426b, 426c to delete the e-mail message from the sent box of the sender, the inbox of the recipient, and storage at the server 404, including storage in the temporary database for 416. In general, the deletion function is configured to delete all instances of the e-mail messages whether they are locally stored on the server 404 or remotely stored on the client storage. As noted above, if the e-mail messages stored on the client storage, the e-mail message has already been tagged, identified, associated with metadata, or correlated to the lifetime setting, which should identify the e-mail message as one that needs to be deleted when the timer has expired.

Figure 5:
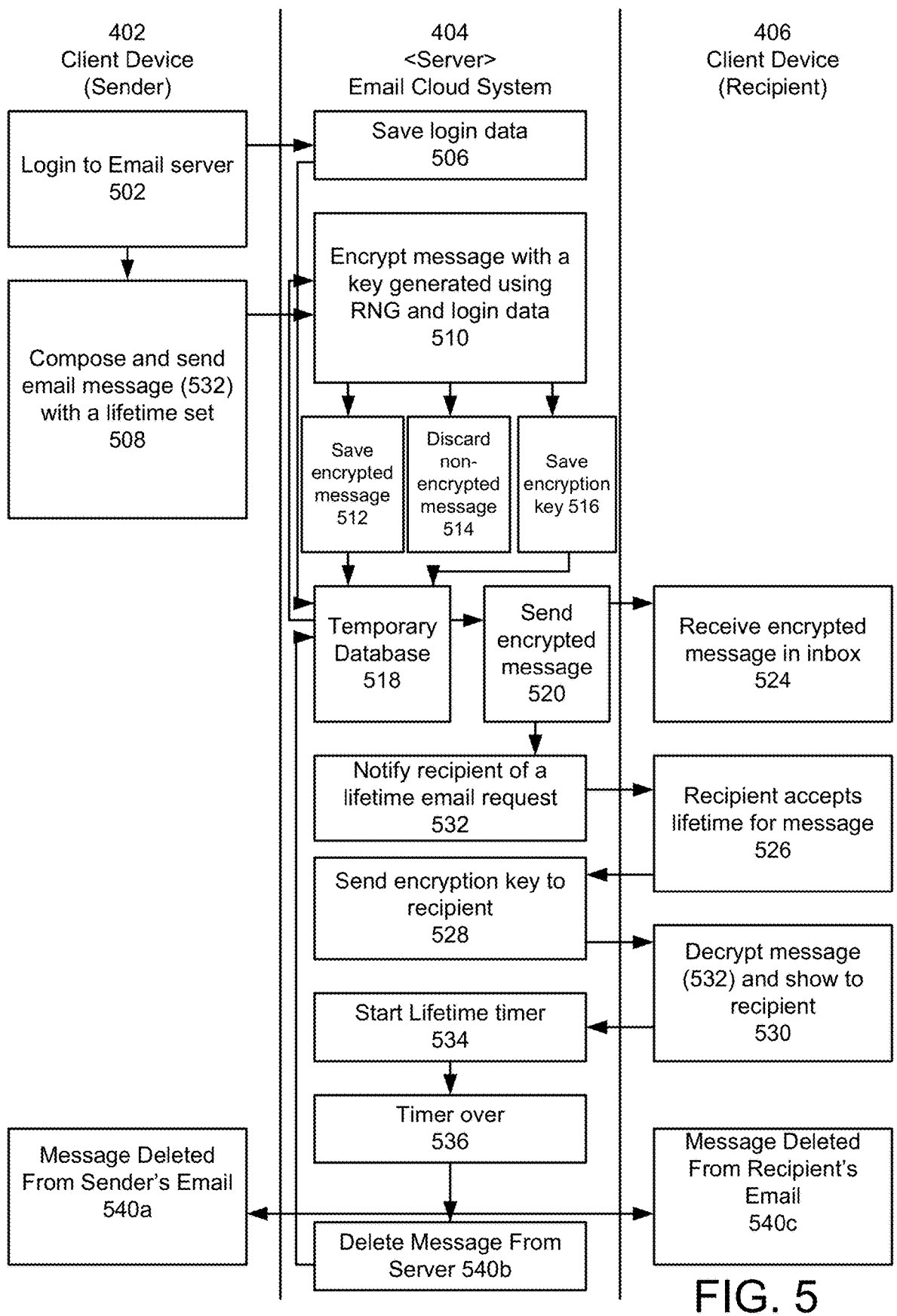
FIG. 5 illustrates another embodiment of communication between a sender, a server, and a recipient, wherein encryption is processed by the server to provide security for messages being communicated in accordance with a lifetime setting of one embodiment.

FIG. 5 illustrates another embodiment of communication between a sender, a server 404, and a recipient, wherein encryption is processed by the server 404 to provide security for messages being communicated in accordance with a lifetime setting. As shown, the sender may login 502 into an e-mail cloud system utilizing login data. The login data may include the user's name, password, credentials, keywords, numeric input, voice input, or biometric input. At the server 404, the login data is saved 506, confirming that the user has successfully logged in. The login data can also include metadata about the login transaction, such as the time of day the user logged in, the IP address of the user, and other identifying information of the device used to login. In operation 508, the sender 404 will compose an e-mail message 532 and also select a lifetime for the e-mail message 532.

A "lifetime" is a setting of the lifetime for the e-mail message that will be communicated to the recipient or recipients of the e-mail message 532. At the server 404, the e-mail message 532 will be encrypted 510 using an encryption key. Using the login data for the encryption process enables for the e-mail message to be encrypted each time a message is composed and sent in accordance with lifetime processing. In operation 512, the encrypted message is saved 512 to a temporary database 518. In operation 514, the original message is deleted, which would be the original message that has not been encrypted. In operation 516, the encryption key used to encrypt the message (and in some embodiments usable to decrypt the message) is saved in the temporary database 518, for further processing for lifetime.

The server 404 will then send the encrypted message 520 to the recipients inbox in an encrypted form. The message 532 may not be immediately viewable or maybe viewable with a lock indicator or some other indicator noting that the message 532 is not yet accessible or subject to lifetime. In operation 520, the server 404 will send the recipient the notification that the sender wishes to send an e-mail with a lifetime setting. The recipient may then accept the lifetime setting for the message 526, if he so chooses, and this will cause the server to send 528 the encryption key to the recipient. The recipient can now decrypt the message with the key in operation 530. The operation 530 can act to illustrate the message that was sent 524 as now accessible or no longer show a lock key which would allow the user to simply click on the message 532 or select the message using any other input mechanism to view the message 532.

A message 532 will then be opened, and this opening function will be transmitted to the server 404 or communicated to the server 404 which would start the timer 534. Once the timer expires 536, the server 404 will delete the messages (e.g., message 532) from the inbox or sent box of the sender 540a, inbox or sent box of the recipient 540c, and delete the encrypted messages and encryption keys 540b from the temporary database 518. In general, the expiration of the timer will act to perform a cleaning operation which will find any messages transacted for the conversation between the sender and recipients, such that the messages are removed from the service history and the users history permanently.

In some embodiments, lifetime settings can be preset for specific communications with specific users or tasks. For example, if certain tasks are considered highly confidential, messages between users for those confidential tasks will be automatically tagged as requiring lifetime. In one embodiment, when the user begins to compose a message related to a specific task that has been pre-defined as confidential or highly confidential, the user will be requested to set a lifetime or recommended a lifetime for the message or conversation.

Figure 6:
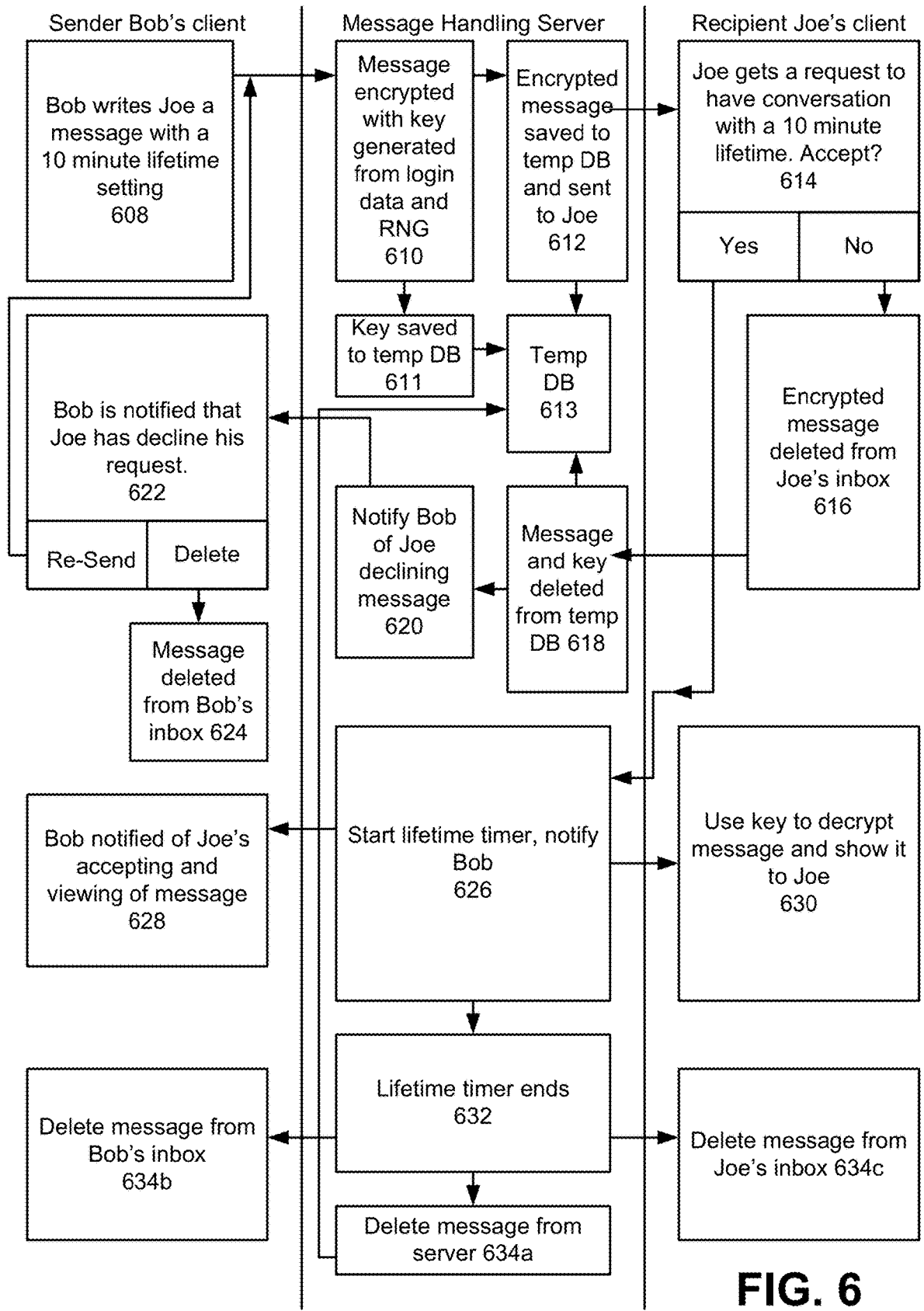
FIG. 6 illustrates another example flow process between a sender and a recipient, between a sender device, a server, and a recipient device, in accordance with one embodiment.

FIG. 6 illustrates another example flow process between a sender Bob and a recipient Joe, between a sender device 602, a server 604, and a recipient device 606. In operation 608, the sender writes a message for Joe with a 10 min. lifetime setting. The server can encrypt the message in operation 610 with a key. In one embodiment, the key can be generated using at least part of the user's data. In one embodiment, the user's data can be identification information pertaining to the user, which can be used as a variable input to the encryption process. In another embodiment, the user's data can include a login time to provide more variants to the encryption key generated each time, and/or an IP address associated with the user, and/or an identifier (e.g., serial number) of the sender's device 602 accessing the server 604, and/or a random number that is generated by a random number generator. The key can then be saved to a temporary database 613 in operation 611. In operation 612, the encrypted message is saved to the temporary database 613 and sent to the recipients in-boxes. The encrypted message can also be saved to the temporary database 613. In one embodiment, the temporary database 613 can be a database that includes messages that have been identified as temporary in nature. A message that has been identified as temporary in nature may be one that has been assigned or agreed by the parties to have been assigned a lifetime. Therefore, the temporary database 613 can provide storage that includes various messages that may or may not be lifetime tagged or can include only messages that are lifetime tagged, or hybrids thereof.

In this example, Joe will get the request 614 to have a conversation with the sender Bob with a lifetime (i.e., message lifetime) of 10 min. If Joe declines the request 614, then at operation 616 the encrypted message is deleted 618 from Joe's inbox (if already delivered) and from any storage allocated for the encrypted message in the temporary database 613. Operation 620 can act to notify Bob that Joe declined the lifetime request, and can also do so by presenting message 622 to Bob's inbox or message client. Message 622 may indicate to Bob that Joe decline the lifetime request and asks if he would like to resend or delete the message 608 that Bob initially wrote. If Bob decides to resend, the operation moves back to operation 610 or 612. If Bob decides to delete the message, in operation 624 the message is deleted from Bob's inbox and/or sent box.

On the other hand, if Joe decides to accept the lifetime, operation 626 will act to start the lifetime timer after Joe has accepted to view the message. The message can then become viewable to Joe after Joe's inbox receives the key and presents the message in operation 630. In one embodiment, operation 628 can ask to notify Bob that Joe accepted the lifetime and is viewing the message. In a conversation where multiple messages are exchanged, the notification of acceptance need only be provided once for the first message or during the initial acceptance, or after each message is viewed, depending on a chosen configuration.

At this point, the lifetime timer may be monitored and it may expire (i.e., end) in operation 632. At operation 634, when the lifetime timer ends for the message, the server may instruct or simply delete the messages from the in-boxes and sent boxes of Bob and Joe. In one embodiment, the server will also perform a cleanup operations 634a, 634b, 634c to delete messages and the keys from the temporary database 613.

Figure 7:
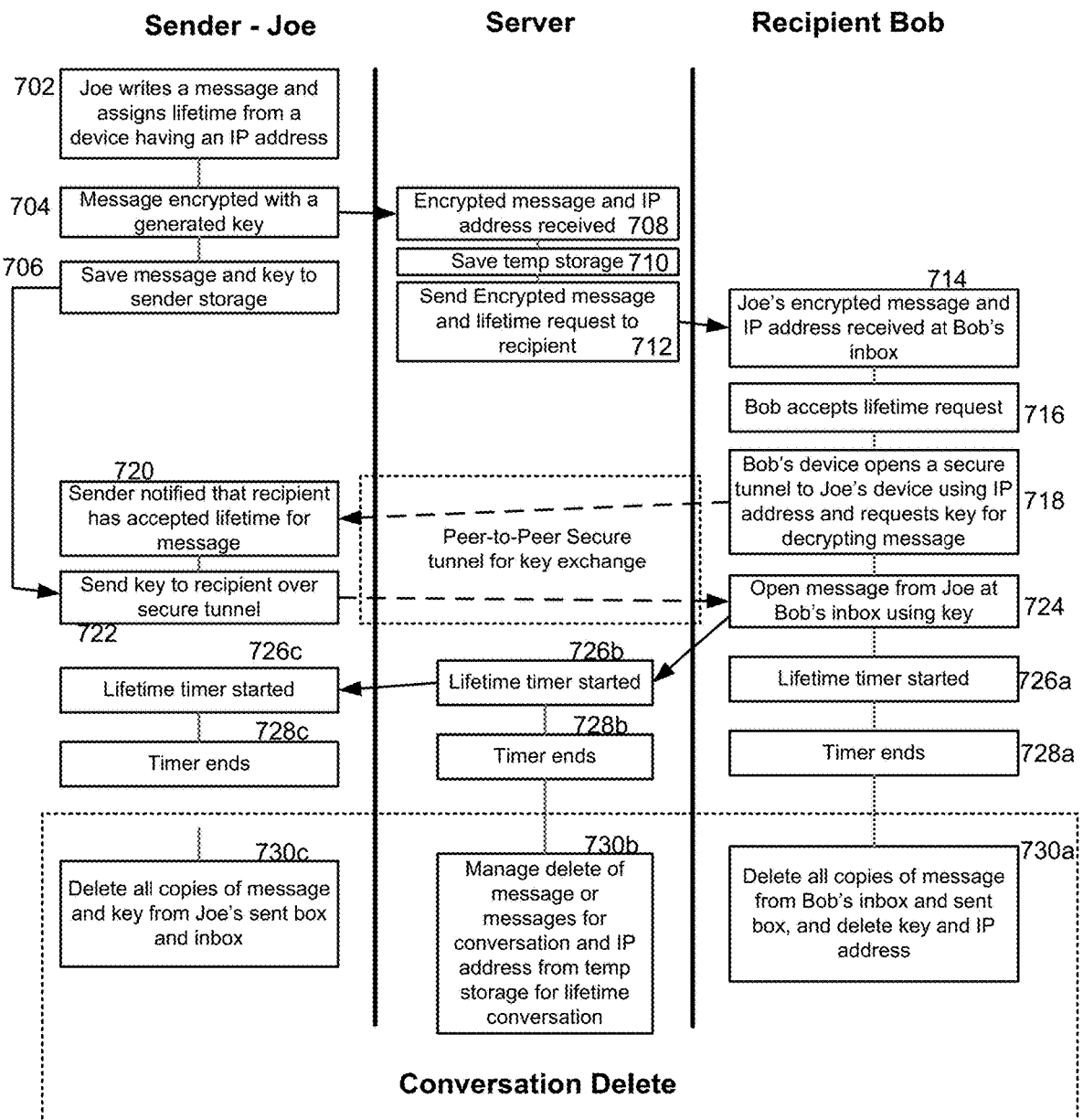
FIG. 7 illustrates another embodiment where a sender is communicating with a recipient, and both the sender and the recipient may have in-boxes and sent boxes for receiving and sending communications, in accordance with one embodiment.

FIG. 7 illustrates another embodiment where a sender Joe is communicating with a recipient Bob, and both the sender and the recipient may have in-boxes and sent boxes for receiving and sending communications. In one implementation, an exchange of encryption keys is facilitated by a peer-to-peer tunnel between the sender and the recipient, and messages are exchanged via the server in an encrypted format. Thus, the server does not receive an unencrypted messages exchanged between the parties.

In operation 702, sender Joe will write a message and will assign a lifetime from a device having a sender IP address. An application on the sender's device will encrypt the message 704 with a generated key. The key can be generated using a random number generator or user data or a combination thereof. The message and the key are then saved 706 to the sender storage, e.g., the sender's device storage.

The sender's device, in one embodiment, may be utilizing an application that is able to communicate with a server for managing the communications. The application may be an application (e.g., app) downloaded from an application store, or an application client installed on the sender's device. In these examples, the application on the sender's device will communicate with the server which provides or facilitates the services for communication to a recipient. In this example, the recipient may also be utilizing the same services and utilizing the same application. For example, the same application may be one provided by the server for the sender and the recipient. In one configuration, the server provides the communication application and the sender and recipient can then become recipients and senders depending on who is sending messages and the direction of messages, wherein the server manages the communication.

Continuing with the example of FIG. 7, the server will receive the encrypted message and the IP address of the sender's device in operation 708. In operation 710, encrypted message and the IP address is saved to storage of the server or storage managed by the server. The storage, in one embodiment, is temporary storage, which will allow for the messages that are associated with a lifetime to be identified and deleted once the communication or conversation or messages have been determined to have exceeded the timer set by the lifetime. In operation 712, the encrypted message and lifetime request is sent to the recipient Bob. In operation 714, the encrypted message and IP address from the sender Joe is received in Bob's inbox or Bob's user interface that provides access to messages.

In operation 716 it is determined that Bob has accepted the lifetime request and Bob's device. In operation 718, a secure tunnel to Joe's device is established utilizing the IP address and other communication data to allow a request for the key for decrypting the message. In one embodiment, the secure tunnel is a peer-to-peer secure tunnel that will enable key exchange between the sender and the recipient. In one embodiment, if messages continue for a conversation, i.e., session, between Joe and Bob, the same key can be used for the session. In such a case, the exchange of the key using the peer-to-peer secure tunnel may only occur once during the conversation. In other embodiments, the key can be exchanged for each message of conversation. In operation 720, the sender is optionally notified that the recipient has accepted the lifetime for the message. The application of the sender will then send the key 722 to the recipient over the secure tunnel.

The sending of the key by the application on the sender's device will be transparent to the sender, and is a background operation which occurs during the peer-to-peer secure tunnel creation and key exchange. The key is then transferred in the secure tunnel to the recipient. Then, in operation 724, it is determined that the message has been opened at the recipient's inbox using the key. Opening of the message can occur at any time when the recipient has determined that it is convenient to read the message sent by the sender. In another embodiment, if the message communication is a chat or text message, it is more likely that the sender and the recipient are actively engaged in a conversation and thus the chat or text message is likely to be read in near real-time.

If the communication is an e-mail conversation, it is possible that the recipient and the sender engaged in an asynchronous communication over a period of time. If the communication is an e-mail communication and the recipient does not open the message for a period of time, the server can direct that the message be deleted from the recipient's inbox or message receipt interface.

The opening of the message in operation 724 by the recipient will trigger a lifetime timer to start, consistent with the lifetime request. As noted above, the lifetime request can include an amount of time, such as 10 min., 5 min., one day, 2 days, multiple days, a week, month, a year, or some configurable period of time. The lifetime timer, in one embodiment, can be determined to have started by the recipients device in operation 726a. The recipients device can also communicate to the server indicating that the message was opened which would synchronize or start the lifetime timer 726b at the server. The server can also notify the sender that the lifetime timer 726c should be started. In one embodiment, the recipient, the server, and the sender will have substantially synchronized lifetime timers. In other embodiments, there may be a delay between the communication times between the sender, server, and recipient that may determine slightly adjusted start time timers. In still other embodiments, the timers can be independently operated such as on a per message basis.

In another embodiment, communication can be synchronized so that the lifetime timer can be substantially standardized between the sender, recipient, the server. In operation 728a-c, it is determined that the timer has ended. Once the timer has ended, a conversation deletion process is processed. The conversation deletion process will include operation 730a-c, which act to remove the messages, keys, IP addresses, and other metadata associated with the conversation and associated message or messages. In operation 730a, all copies of the message and any associated keys that have been send or received from Joe's sent box or in box, respectively. In operation 730b, all copies of the one or more messages and any associated keys that have been temporarily stored at the server for a given conversation whose lifetime has been exceeded. At operation 730*b*, the server can manage the deletion of the storage and may also direct client application to initiate deletion of messages potentially stored by the client applications at client devices. In operation 730*c*, all copies of the message and any associated keys that have been send or received from Bob's sent box or in box are deleted, respectively.

Figure 8:
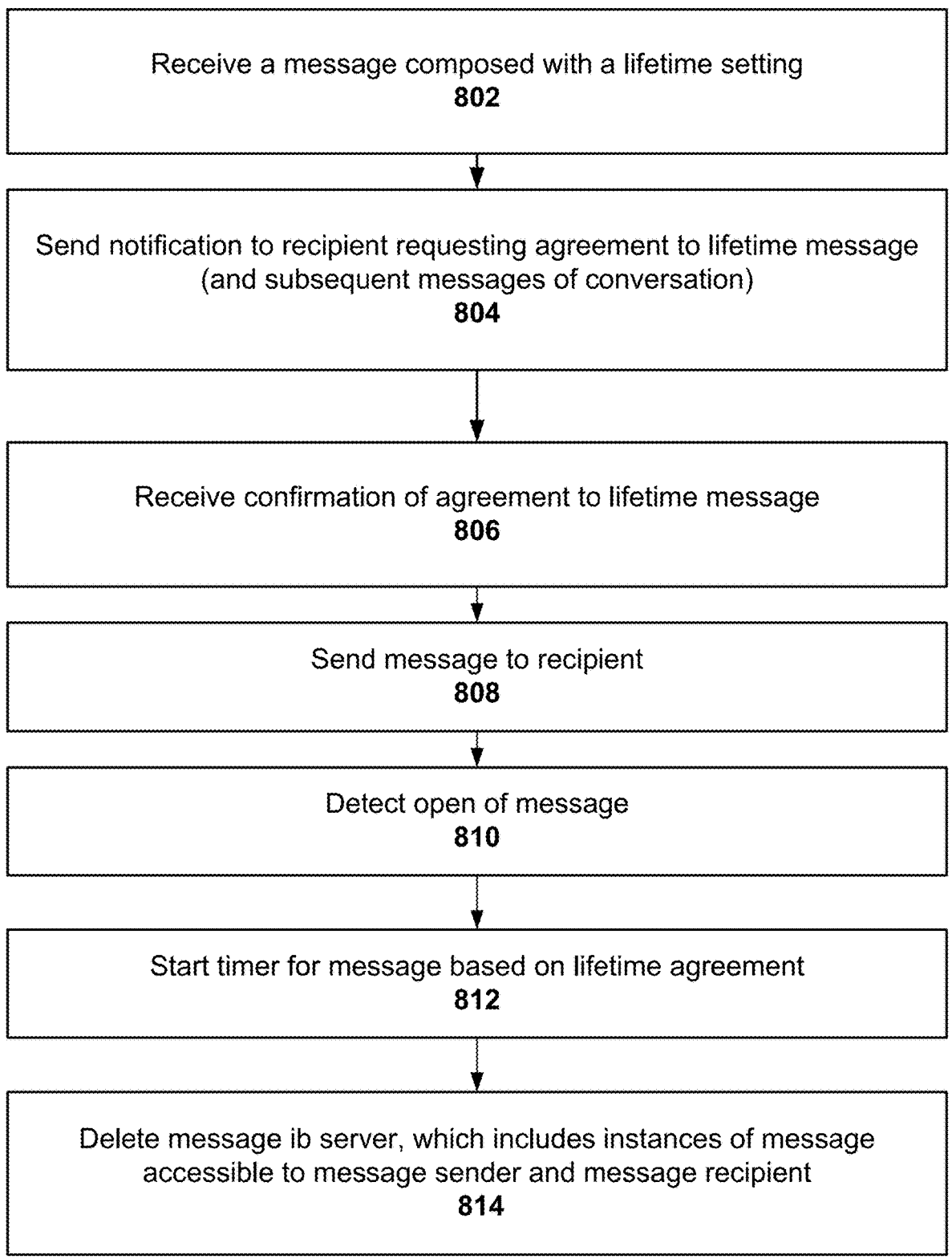
FIG. 8 illustrates an example where messages are processed by a server or servers or cloud system to implement lifetime settings for a message or communications between users, in accordance with one embodiment.

FIG. 8 illustrates an example where messages are processed by a server or servers or cloud system to implement lifetime settings for a message or communications between users, in accordance with one embodiment. In operation 802, a message is received as composed with a lifetime setting. The message may be composed using any client whether remote from a server or a client that is online and provided by a browser or custom application. The lifetime setting as described above is a setting that limits the amount of time that the message will survive or have a lifetime before being deleted from the sender, the recipient, and any server storage and local storage.

The lifetime setting provides for private communications to be had between parties, while allowing the parties to read the conversations with the security that the messages will be deleted from all locations per agreement of the parties. The lifetime setting, as described above will have a timer such that once a message has been viewed or opened or accessed, the message or messages will be deleted. In one embodiment, the lifetime setting can also provide a timer for the recipient to see the amount of time left for viewing the message before it is deleted.

In operation 804, a notification is sent to the recipient asking or requesting if agreement can be had as to life timing a message (and subsequent message of a conversation). If the user is unfamiliar with the term associate with lifetime of the message, the notification can provide more information indicating that the lifetime will set amount of time for the message to be viewed once opened and then will be deleted. In operation 806, confirmation is received that agreement the lifetime the message has been established with the recipient. In operation 808, the message is sent to the recipient, consistent with the lifetime agreement for that message or conversation. In operation 810, the server will detect when the message has been opened by the recipient. In one embodiment, opening of the message will send a message back to the server or the server will detect that the message has been opened if the client is provided by the server in an online format.

In operation 812, the timer is started for the message based on the lifetime agreement between the parties. In operation 814, the message is deleted from the server which includes instances of the message accessible to the message sender and the message recipient once the lifetime has expired. As noted above, the message can be deleted by clients at the direction of a server when the lifetime has expired or the client application can delete the message at the termination of the lifetime, based on code executing on the client (e.g. thin client).

Again, it should be understood that the messaging operations described with relation to e-mails are equally applicable to any chat communication. A chat communication can be started by a sender who may assign a lifetime to the chat message. The recipient of the chat message will see that the lifetime has been requested and may accept to communicate in accordance with a lifetime agreement for that chat communication or individual messages. For instance, once a chat message is received, the chat recipient who agreed to the lifetime will see the message and in one embodiment will see a timer. Once the timer expires, the chat content will disappear. Similar operations will occur with respect to responses from the recipient back to the sender and so on. The chat messages can be in the form of text messages, video chat messages, picture chat messages, and combinations thereof.

In one embodiment, lifetime settings can be applied to messages exchanged using an application for enterprise communication services. Enterprise communication applications can include, for example, applications that are hosted by service providers for specific enterprises, e.g., companies, groups, collaboration partners, or two or more persons. If the enterprise is a company, for example, the company can add or subtract people, e.g., employees, contractors and partners, from authorization to use the communication service. The communication service is typically used by companies to enable collaboration amongst its members, who may or may not be present at the same location, and to communicate with parties outside of the company. This communication service is also used to store information (e.g., documents, postings, messages, artwork, media, and generally digital content) and enable collaboration on projects. The communication service may include a messaging component, which allows its members to communication amongst themselves in regard to projects, project status, meetings, and other organizational matters. The messages can be in the form of postings to groups, postings to projects, directed to groups of people, or directed to individual members of the company. Commonly, these communication services are referred to as private social networks. These private solicit networks, as they belong or are used by companies, may be referred to as being operated or utilized by enterprises. Private social networks can be contrasted with open social networks, such as Facebook, Myspace, Google+, Twitter, and others, in that the communications are primarily used to further the work, goals and social collaboration within enterprises.

In private social networks, administrators can manage who is a member and who is not a member. Members are provided with credentials (e.g., passwords) to allow access to applications, e.g., websites and mobile apps. In one embodiment, an administrator of a private social network can assign members different levels of privileges. One privilege setting may be a lifetime setting for particular types of communications or for particular members. For example, the administrator can set a lifetime for specific or all member text messages. For example, the administrator may wish that all text messages have no more than a one week lifetime. In one embodiment, text messages can be dynamically assigned based who the member is or based on what the context and/or content of the messaging. For instance, if a member is working on a top secret project for the enterprise, text messages may have a lifetime of 1 hour or less. If the project is not sensitive, such as a text message to a group to join a birthday cake cutting break, then the lifetime can be longer, e.g., 1 month. In one embodiment, lifetime settings can be applied to all types of communications managed by the private social network.

Lifetimes can also be assigned to documents saved or posted to specific groups or projects, content posted, media saved, etc. In one embodiment, the lifetime can also be negotiated within the private social network, such that the recipient needs to accept the lifetime before communication is begun. In other embodiments, the messaging user interface (UI) interface may have an indicator that identifies the lifetime for the message, communication, document or content.

In yet another embodiment, lifetime settings can be applied to any piece of digital data. For example, the lifetime setting can be applied to a file of a user. The user can make a selection to a setting that assigns a lifetime to the file. The file may be a text file, for instance, and when the lifetime is assigned, the text file will be automatically deleted or erased when the lifetime expires. Using this functionality, users can assign lifetime settings to any document, and the setting can have different settings based on the sensitivity or the duration that the user wishes the file to exist. In some instances, users may set a lifetime of minutes, hours, days, months, years, etc. Some documents are created for very temporary projects or non-official work. In such cases, the documents can be assigned a shorter lifetime, such as one week. In other cases, business documents can be provided with longer lifetime settings, e.g., such as 1 year. In some cases, draft documents can be assigned a lifetime that is shorter than a final document. For instance, if a file is crated with various versions or revisions, the revisions can be assigned a short lifetime setting, e.g., such as 1 month, whereas the final document can be assigned a lifetime of 2 years, or no lifetime setting.

By allowing documents or files to have assigned lifetimes, documents made as attachments to messages can have their own lifetime setting that may be different or the same as the lifetime setting of the message. In some cases, the lifetime setting set for a message will be automatically applied to the attached documents. In some cases, the message and the attachments can have different lifetime settings. Generally speaking, the ability to apply lifetime settings to documents and messages enables users to strategically set when automatic deletions will occur.

Additionally, lifetime settings enable management of data. Data stored in storage systems usually include files and digital content that is not useful, old, or not worth keeping. However, when no lifetime is applied to files/data, more data is saved and kept in storage perpetually. This causes the need for more and more storage, even while a large or growing percentage of the saved data is old, worthless, or not useful to keep. By implementing lifetime settings to files/data, data in storage systems will automatically be deleted. As can be appreciated, lifetime settings can therefore act to free up storage space and reduce the amount of processing power to keep such files available or backed up. Along these lines, files (and copies thereof) that are backed up with lifetime settings can also be automatically deleted in accordance with the lifetime settings. This function can act to provide more free space in backup systems, storage and directories.

Further example embodiments are disclosed below.

In one embodiment, a computer-implemented method for exchanging text messages is disclosed. The method includes receiving an electronic message from a given sender, and sending or delivery to a recipient user electronic device. The method also includes negotiating or establishing a conversation lifetime for the one or more electronic messages exchanged between the given sender and the recipient and deleting the one or more electronic messages in accordance with the conversation lifetime.

In another embodiment, a method is disclosed, which includes examining one or more messages exchanged between individuals over an electronic communication system. The examining is configured to identify a message that is associated with a lifetime setting. The lifetime setting identifies a duration period for the message measured between creation of the message and expiration of the duration period. The method also includes automatically deleting the message when the duration period is determined to have expired.

In one embodiment, a method is disclosed that includes accessing a storage system having files, examining the files to identify a file having a lifetime setting associated therewith. The lifetime setting being a setting that identifies a duration of life of the file. Then, automatically deleting the file upon determining that the duration of life of the file has expired.

In one embodiment, a method for managing messages is disclosed. The method includes receiving a text message, by server, from a sender to a recipient. Then, determining, by the server, that the text message has a lifetime setting set by one of the sender or recipient of the text message. The lifetime setting defines a period of time for saving the text message. Then, automatically deleting, by the server, the text message after the period of time has been reached.

In one embodiment, a method for managing messages includes receiving an email message, by server, from a sender to a recipient. Then, determining that the email message has a lifetime setting set by one of the sender or recipient of the email message. The lifetime setting defines a period of time for saving the email message. Then, automatically deleting the email message after the period of time has been reached.

In one embodiment, a system for managing electronic communications is disclosed. The system includes providing, by a server, a user interface for composing and receiving messages, and the user interface is provided to senders and recipients. Then, receiving, by a server, a message from a sender to a recipient. The message includes a lifetime setting that defines a duration of time for saving the message. The server then deletes the message from storage of the system after the duration of time for saving the message has expired.

In some embodiments, the user interface provides an input to enable application of the lifetime setting.

In some embodiments, the user interface provides an indicator of when a lifetime setting is applied and duration or a timer for the duration. The indicator of the lifetime setting is viewable via the user interface of the sender and the recipient.

In some embodiments, the lifetime setting is approved by the recipient before making the message viewable by the recipient.

In some embodiments, approval of the lifetime setting is transacted between the sender and the recipient before the message is delivered or made viewable by the recipient.

In some embodiments, the lifetime setting is applied to each of a plurality of messages in a string of messages associated with the message.

In some embodiments, approval of the lifetime setting is transacted for approval between the sender and the recipient before the message is delivered or made viewable by the recipient and further transacted for approval by additional recipients added to the message.

In one embodiment, a method includes saving a file with a lifetime setting, and then automatically deleting the file after the lifetime setting expires.

In one embodiment, a server is provided, which functions to send a message with a lifetime setting to a recipient and delete the message from storage associated with the sender and the recipient after a period of time expires as set by the lifetime setting.

In one embodiment, a system for managing messages is provided. The system includes a storage system for storing messages exchanged by senders and recipients. The system includes logic for enabling assignment of lifetime to messages. The lifetime is a period of time during which the message will remain available. The system further includes logic for examining messages to determine lifetime of said messages, and logic for deleting messages from the storage system upon determining that the period of time has expired.

In one embodiment, a method includes processing messages of senders and recipients, where the processing includes identifying a lifetime setting for a message. The method acts to delete the message after a time period expires as defined by the lifetime setting. The deleting occurring automatically without action by a sender or recipient of the message.

In one embodiment, an online chat system is disclosed. The system includes a client interface for enabling access to users of the online chat system. Each user is provide with a space for receiving and sending messages. The client interface includes an input for setting a lifetime setting for a message being composed by a sender to a recipient via the client interface. Further provided is processing logic of the online chat system for tracking messages having a lifetime setting, and processing logic for deleting a message having a lifetime setting after expiration of a time period defined by the lifetime setting, the deleting acting to delete the message from the space of the sender and the recipient.

In some embodiments, a viewing area for the message includes an indicator showing the lifetime and the time period.

Figure 9:
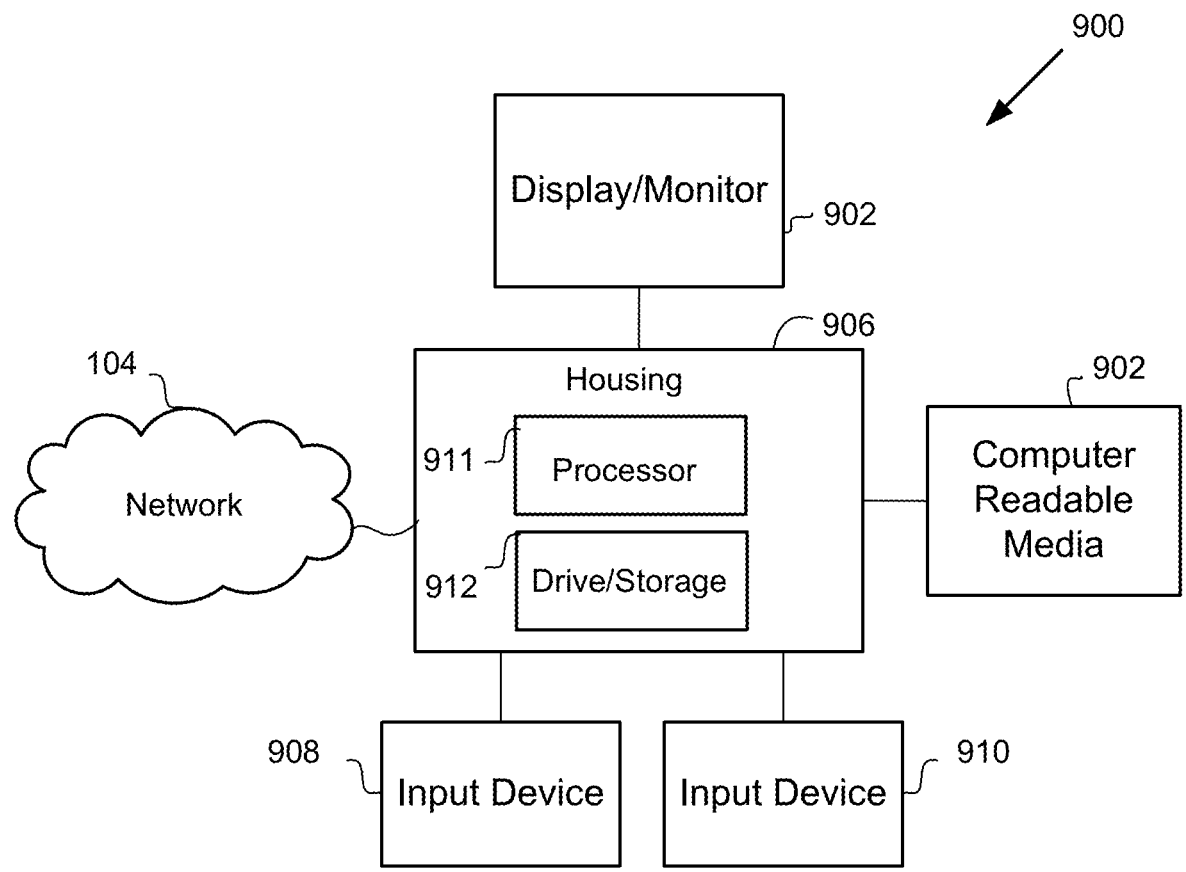
FIG. 9 shows an exemplary computer system.

In some embodiments, the time period is decreased in a form of a timer, which is displayed on the viewing area for the message FIG. 9 shows an exemplary computer system. One or more of the exemplary computer systems are suitable for use with at least one embodiment of the invention. The computer system 900 includes a display/monitor 902 having a single or multi-screen display, touch screen, (or multiple displays), a housing 906, an input device 908 (e.g., keyboard), input device 910 (e.g., a mouse, input surface, buttons, speakers, controller, etc. The housing 906 houses the computer system. The housing 906 can, for example, be the casing of a smart phone, a laptop, a tablet, a desktop, etc. The housing 906 can also house drive(s)/storage 912 (e.g., such as a CD-ROM, system memory, and a mass storage device (e.g., hard drive or solid-state drive), etc.), which may be utilized to store retrievable software programs incorporating computer code that implements an embodiment of the invention, data for use with embodiment(s) of the invention, and the like. Other exemplary computer readable medium may include computer readable digital video, audio, including floppy disk, tape, flash memory, system memory, and hard drive may be utilized. The housing 906 may also house a processor 911, which is used to process operations for carrying out one or more operations described herein. The processor can also enable communication of data with a network 104. The network may be, for example, a local area network, a wide area network, or the Internet.

In some embodiments, features, functions and configurations disclosed in the following patent application may be combined with features described herein, and may be used to form or define specific combined embodiments, as will be appreciated by those skilled in the art. Therefore, reference may be made to U.S. patent application Ser. No. 14/985,124, entitled "NETWORK-BASED MESSAGING SYSTEM WITH DATABASE MANAGEMENT FOR COMPUTER BASED INTER-USER COMMUNICATION," and filed on Dec. 30, 2015, and which is hereby incorporated by reference.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. An electronic messaging system, comprising,
the electronic messaging system being for an enterprise that facilitates user accounts for users of the electronic messaging system;
a client interface provided by the enterprise to respectively enable access to each of the users of the electronic messaging system, each user being provided with an inbox for electronically receiving messages and a sent box for electronically sending messages, the client interface configured to receive an input for applying a lifetime setting for a message made by a sender to a recipient via the client interface;
the applying of the lifetime setting being automatic based on a sensitivity of the message as determined by the enterprise;
a processor processing logic of the electronic messaging system for tracking messages having the lifetime setting; and the processor for deleting a message having the lifetime setting after expiration of a time period defined by the lifetime setting, the deleting acting to remove the message from the sent box of the sender and the inbox of the recipient.

2. The electronic messaging system of claim 1, wherein the time period is started when the recipient opens the message, and said sensitivity of the message is based an identity of either the sender or the recipient of the message.

3. The electronic messaging system of claim 2, wherein a viewing interface for the message includes an indicator showing the lifetime and the time period.

4. The electronic messaging system of claim 3, wherein the time period is decreased in a form of a timer, which is displayed on the viewing interface for the message.

5. The electronic messaging system of claim 1, wherein the time period is started when the recipient receives, or opens, or views the message, and said sensitivity of the message is based on an analyzed context of the message, said context includes subject matter discussed or language present in the message.

6. The electronic messaging system of claim 1, wherein the recipient is requested to agree to the lifetime before the message is made viewable to the recipient, or no agreement is required if the lifetime is set by the enterprise based on the sensitivity of the message.

7. The electronic messaging system of claim 1, wherein the message is an electronic text message or an electronic mail message, and the sensitivity of the message is based on enterprise rules set by an administrator of the electronic messaging system.

8. The electronic messaging system of claim 1, wherein the message includes as an attachment a file or a video or a picture or a media file or combinations of two or more thereof, and said attachment is further associated with the lifetime setting when the lifetime setting is applied to the message.

9. The electronic messaging system of claim 1, wherein the message is an electronic chat message or an electronic mail message.

10. The electronic messaging system of claim 1, wherein the electronic messaging system is used by the enterprise enables collaboration of messages and/or files between the users via their respective user accounts and an administrator of the enterprise is enabled to assign lifetime settings differently to two or more user accounts of the enterprise.

11. The electronic messaging system of claim 1, wherein the enterprise is enabled to mark files with lifetime settings separately from said messages or user accounts.

12. The electronic messaging system of claim 1, wherein the sensitivity of the message is identified based on a rule applied by the enterprise based on analysis of words in the message.

13. A computer implemented method for managing electronic messages, comprising:
electronically receiving a message for a recipient, the message being from a sender and identified for the recipient, the sender having a user account associated with an enterprise and the enterprise is configured to assign a lifetime setting to the message,
the enterprise being configured to assign a period of time for the lifetime setting based on sensitivity set by the enterprise for the sender;
enabling viewing of the message by the recipient; and
deleting the message automatically when the period of time expires as set by the lifetime setting.

14. The computer implemented method of claim 13, wherein deleting of the message includes deleting copies of the message on one or all of a server, a client device of the sender or a client device of the recipient.

15. The computer implemented method of claim 13, wherein the message is one of a text message or an email message or an enterprise message, or combinations thereof.

16. The computer implemented method of claim 13, wherein attachments of the message inherit the lifetime setting of the message.

17. The computer implemented method of claim 13, wherein the enterprise enables collaboration of messages and/or files between the users via their respective user accounts and an administrator of the enterprise is enabled to assign lifetime settings differently to two or more user accounts of the enterprise.

18. The computer implemented method of claim 13, wherein the enterprise is enabled to mark files with lifetime settings separately from said messages or user accounts.

19. The computer implemented method of claim 13, wherein the sensitivity of the message is set by the enterprise based on analysis of words in the message and application of preset rules for words in messages.

20. A computer implemented method for managing electronic messages, comprising:
electronically receiving a message for a recipient, the message being from a sender and identified for the recipient, the sender having a user account associated with an enterprise;
accessing administrative settings for the enterprise, the administrative settings identifying lifetime settings for users of the electronic messages of the enterprise, the user account of the sender having associated therewith a lifetime setting for messages sent by the sender;
applying a lifetime to the message based on the lifetime setting associated to the sender when sending electronic messages via the enterprise;
sending a link to the recipient in place of the message, the link providing access to the message with information regarding the lifetime setting for confidentiality regarding the message, such that access of the link provides access to the message to the recipient; and
deleting the message once the lifetime setting for the message has expired.

* * * * *